United States Patent
Croxford et al.

(10) Patent No.: US 10,825,231 B2
(45) Date of Patent: Nov. 3, 2020

(54) METHODS OF AND APPARATUS FOR RENDERING FRAMES FOR DISPLAY USING RAY TRACING

(71) Applicants: Apical Limited, Cambridge (GB); Arm Limited, Cambridge (GB)

(72) Inventors: Daren Croxford, Swaffham Prior (GB); Mathieu Jean Joseph Robart, Papworth Everard (GB)

(73) Assignees: Arm Limited, Cambridge (GB); Apical Limited, Cambridge (GB)

( * ) Notice: Subject to any disclaimer, the term of this patent is extended or adjusted under 35 U.S.C. 154(b) by 0 days.

(21) Appl. No.: 16/214,590

(22) Filed: Dec. 10, 2018

(65) Prior Publication Data
US 2020/0184707 A1 Jun. 11, 2020

(51) Int. Cl.
| | |
|---|---|
| G06T 15/00 | (2011.01) |
| G06T 15/06 | (2011.01) |
| G06T 17/10 | (2006.01) |
| G06T 7/11 | (2017.01) |
| G06T 7/20 | (2017.01) |

(52) U.S. Cl.
CPC ............ G06T 15/06 (2013.01); G06T 7/11 (2017.01); G06T 7/20 (2013.01); G06T 15/005 (2013.01); G06T 17/10 (2013.01)

(58) Field of Classification Search
None
See application file for complete search history.

(56) References Cited

U.S. PATENT DOCUMENTS

| | | | | |
|---|---|---|---|---|
| 5,933,146 A * | 8/1999 | Wrigley | ................. | G06T 15/06 345/420 |
| 5,963,203 A * | 10/1999 | Goldberg | ............. | G11B 27/034 715/723 |
| 6,026,178 A * | 2/2000 | Toda | ......................... | G06T 1/20 382/158 |
| 8,054,313 B1 * | 11/2011 | Baraff | ..................... | G06T 13/20 345/473 |
| 9,607,352 B2 * | 3/2017 | Yang | ....................... | G06T 11/40 |
| 9,773,340 B2 * | 9/2017 | Balci | .......................... | G06T 1/20 |
| 10,388,059 B2 * | 8/2019 | Luebke | ................... | G06T 15/06 |
| 10,403,034 B2 * | 9/2019 | Ha | ............................. | G06T 5/30 |
| 2002/0094125 A1 * | 7/2002 | Guo | ........................ | G06T 15/06 382/199 |
| 2002/0145611 A1 * | 10/2002 | Dye | ......................... | G09G 5/14 345/543 |
| 2006/0250414 A1 * | 11/2006 | Golovin | ................ | G06T 11/203 345/611 |
| 2007/0003133 A1 * | 1/2007 | Sevastianov | ............ | G06T 15/60 382/154 |
| 2008/0024499 A1 * | 1/2008 | Bateman | ................. | G06T 17/30 345/441 |

(Continued)

Primary Examiner — Martin Mushambo
(74) Attorney, Agent, or Firm — Vierra Magen Marcus LLP

(57) ABSTRACT

A data processor renders a new frame of a sequence of frames by, for each one of a subset of set of a plurality of regions of the new frame, newly generating output data for data elements in the region in respect of the new frame using a ray tracing process, and by deriving output data for data elements in each remaining region of the set of a plurality of regions of the frame based on data generated previously in respect of a preceding frame.

20 Claims, 10 Drawing Sheets

(56) References Cited

U.S. PATENT DOCUMENTS

| | | | |
|---|---|---|---|
| 2008/0218467 A1* | 9/2008 | Huang | G09G 3/3406 345/102 |
| 2009/0096789 A1* | 4/2009 | Peterson | G06T 15/06 345/426 |
| 2009/0128562 A1* | 5/2009 | McCombe | G06T 15/06 345/427 |
| 2010/0060634 A1* | 3/2010 | Wald | G06T 15/06 345/420 |
| 2010/0194751 A1* | 8/2010 | Wald | G06T 15/06 345/426 |
| 2011/0164035 A1* | 7/2011 | Liao | G06T 7/246 345/419 |
| 2012/0327430 A1* | 12/2012 | Lee | G01B 11/2513 356/625 |
| 2013/0002671 A1* | 1/2013 | Armsden | G06T 15/06 345/426 |
| 2013/0113801 A1* | 5/2013 | Monson | G06T 15/06 345/426 |
| 2013/0198794 A1* | 8/2013 | Dharmapurikar | H04L 65/80 725/118 |
| 2014/0063016 A1* | 3/2014 | Howson | G06T 15/80 345/426 |
| 2014/0146049 A1* | 5/2014 | Ozdas | G06T 15/06 345/426 |
| 2014/0267304 A1* | 9/2014 | Han | G06T 13/80 345/473 |
| 2014/0306949 A1* | 10/2014 | Doyle | G06T 1/20 345/419 |
| 2015/0091894 A1* | 4/2015 | Shin | G06T 15/06 345/419 |
| 2015/0091895 A1* | 4/2015 | Shin | G06T 15/06 345/419 |
| 2015/0123971 A1* | 5/2015 | Lee | G06T 15/06 345/426 |
| 2015/0189267 A1* | 7/2015 | Kaji | G06T 7/80 348/187 |
| 2015/0287174 A1* | 10/2015 | St Romain, II | G06T 5/008 382/169 |
| 2015/0287233 A1* | 10/2015 | Shin | G06T 15/06 345/419 |
| 2015/0325041 A1* | 11/2015 | Ha | G06T 15/506 345/426 |
| 2015/0379763 A1* | 12/2015 | Liktor | G06T 15/80 345/426 |
| 2016/0027203 A1* | 1/2016 | Lee | G06T 15/005 345/423 |
| 2016/0171704 A1* | 6/2016 | Raghoebardajal | H04N 13/122 345/633 |
| 2016/0260245 A1* | 9/2016 | DeCell | G06T 15/06 |
| 2017/0169539 A1* | 6/2017 | Doyle | G06T 15/005 |
| 2017/0206625 A1* | 7/2017 | Fainstain | G06T 1/20 |
| 2017/0236325 A1* | 8/2017 | Lecocq | G06T 15/005 345/426 |
| 2017/0270146 A1* | 9/2017 | Harrison | G06F 7/14 |
| 2017/0309059 A1* | 10/2017 | Howson | G06T 1/20 |
| 2018/0081429 A1* | 3/2018 | Akenine-Moller | G06F 3/14 |
| 2018/0096516 A1* | 4/2018 | Luebke | G06T 15/06 |
| 2018/0108169 A1* | 4/2018 | Miller | G06T 15/08 |
| 2018/0197271 A1* | 7/2018 | Broadhurst | G09G 5/363 |
| 2018/0197323 A1* | 7/2018 | Howson | G06T 15/005 |
| 2019/0155302 A1* | 5/2019 | Lukierski | G06T 17/00 |

* cited by examiner

METHODS OF AND APPARATUS FOR RENDERING FRAMES FOR DISPLAY USING RAY TRACING

BACKGROUND

The technology disclosed herein relates to data processing systems, and methods of operating such systems, in particular in relation to the display of sequences of frames (images) on a display of a data processing system.

FIG. 1 shows an exemplary system on chip (SoC) data processing system 8 that comprises a host processor comprising a central processing unit (CPU) 1, a graphics processing unit (GPU) 2, a display processor 3, and a memory controller 5. The exemplary data processing system may also comprise a video engine (not shown in FIG. 1). As shown in FIG. 1, these units communicate via an interconnect 4 and have access to off-chip memory 6. In this system, the graphics processing unit (GPU) 2 will render frames (images) to be displayed, and the display processor 3 will then provide the frames to a display panel 7 for display.

In use of this system, an application such as a game, executing on the host processor (CPU) 1 will, for example, require the display of frames on the display panel 7. To do this, the application will submit appropriate commands and data to a driver for the graphics processing unit (GPU) 2 that is executing on the CPU 1. The driver will then generate appropriate commands and data to cause the graphics processing unit (GPU) 2 to render appropriate frames for display and to store those frames in appropriate frame buffers, e.g. in the main memory 5. The display processor 3 will then read those frames into a buffer for the display from where they are then read out and displayed on the display panel 7 of the display.

The data processing system 8 will be configured to provide frames for display, and the graphics processing unit (GPU) 2 will correspondingly be configured to render frames, at an appropriate rate, such as 30 frames per second. Modern electronic devices increasingly use higher resolution displays. For example, displays with a "4 k" resolution are becoming more common (a so-called "4 k display").

One rendering process that may be performed by a graphics processor is so-called "ray tracing". Ray tracing is a rendering process which involves tracing the paths of rays of light from a viewpoint (sometimes referred to as a "camera") back through pixels in an image plane into a scene, and simulating the effect of the interaction between the rays and objects in the scene. The output data value e.g. colour of a pixel in the image is determined based on the object(s) in the scene intersected by the ray passing through the pixel, and the properties of the surfaces of those objects. The ray tracing calculation is complex, and involves determining, for each pixel, a set of objects within the scene which a ray passing through the pixel intersects.

Ray tracing is considered to provide better i.e. more realistic images than rasterisation rendering techniques, particularly in terms of the ability to capture reflection, refraction and lighting effects. However, ray tracing is significantly more processing intensive than rasterisation.

The Applicant has recognised that there remains scope for improvement in ray tracing based techniques for rendering a sequence of frames to produce a sequence of frames for display.

BRIEF DESCRIPTION OF THE DRAWINGS

Various embodiments of the technology described herein will now be described by way of example only and with reference to the accompanying drawings, in which:

Figures 3A, 3B, 3C, 3D:
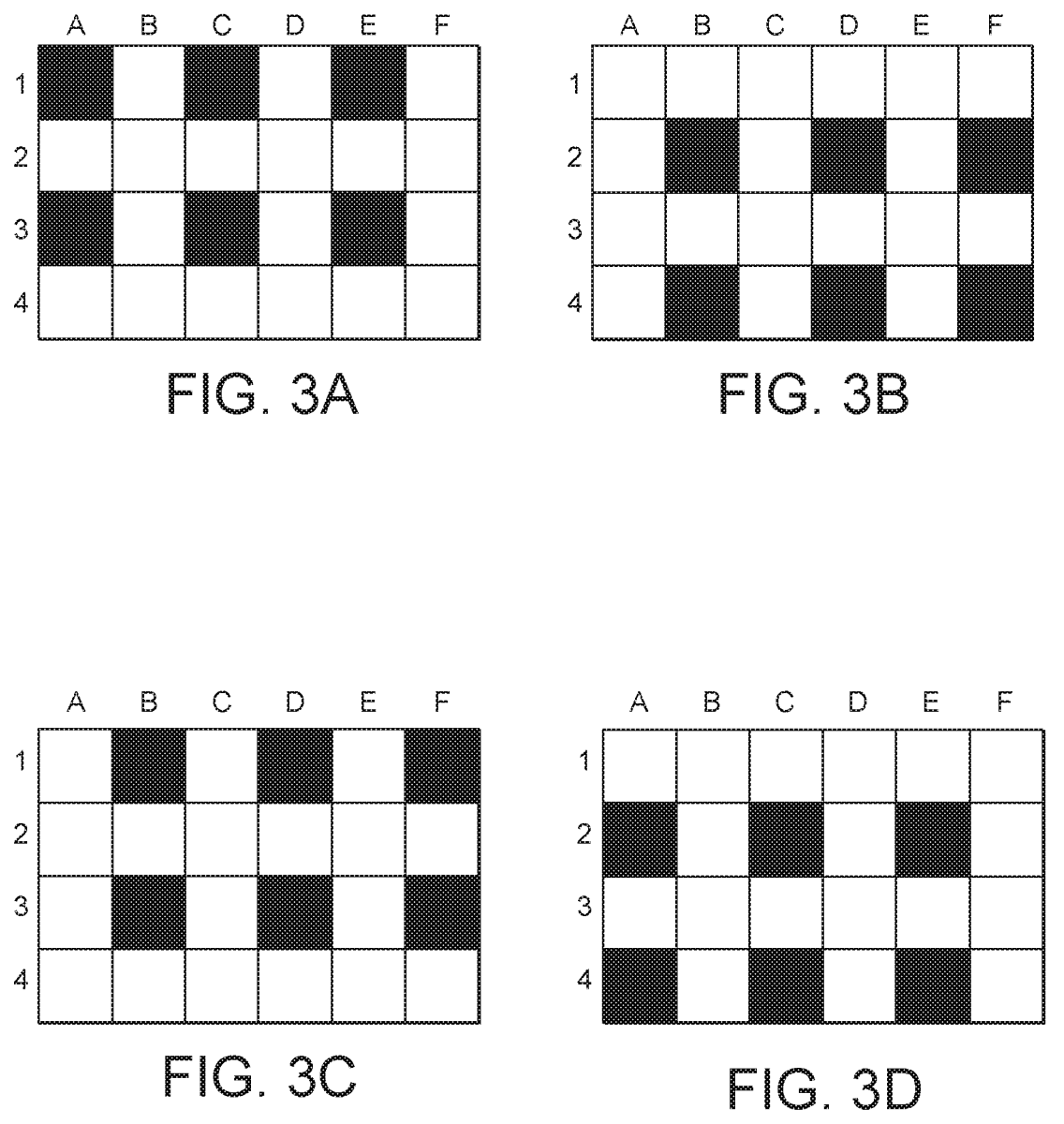

FIGS. 3A-D illustrate the blocks in successive frames for which new data is generated by ray tracing when performing a lower rate checkerboard rendering technique, with each Figure showing only a portion of the frame;

Like reference numerals are used for like components where appropriate in the drawings.

DETAILED DESCRIPTION

Figure 1:
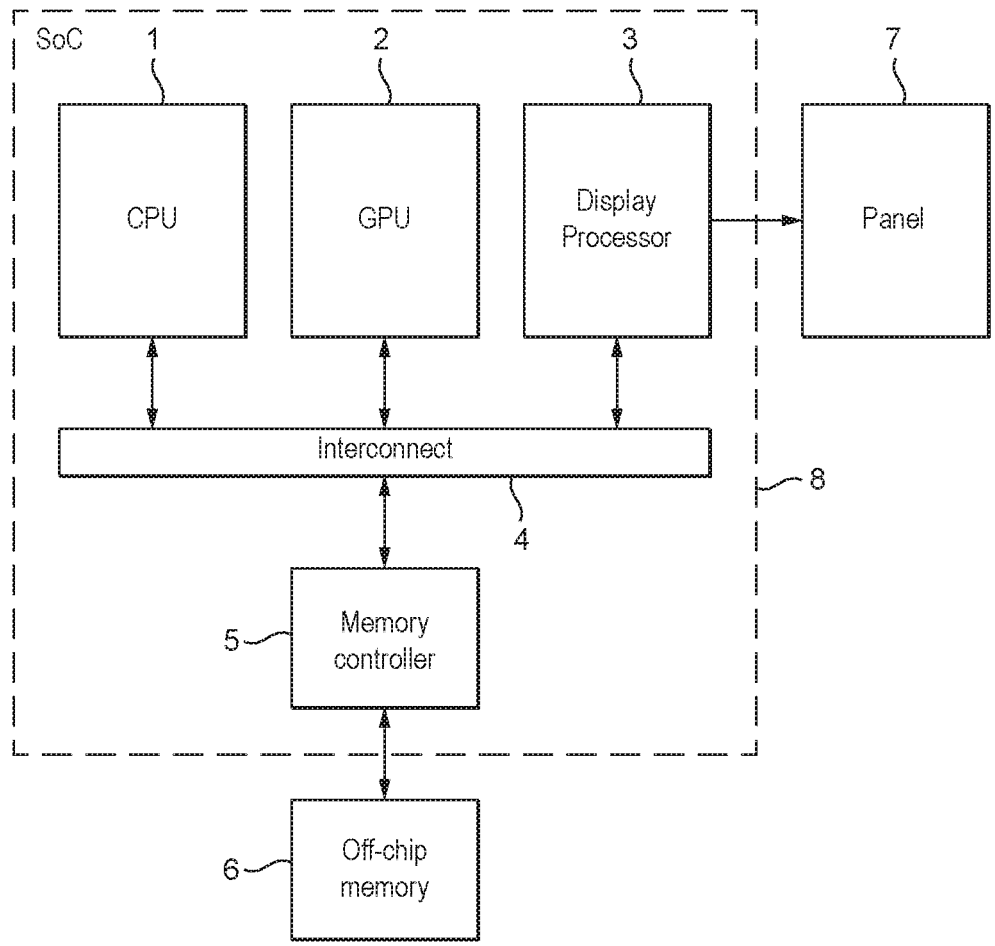
FIG. 1 shows an exemplary data processing system.

A first embodiment provides a method of operating a data processing system that includes a data processor operable to render a sequence of frames to produce a sequence of frames for display, each frame representing a view of a scene of one or more objects;

the method comprising: when a new frame in the sequence of frames is to be rendered;

the data processor rendering the new frame by, for each one of a subset of set of a plurality of regions of the new frame, newly generating output data for data elements in the region in respect of the new frame using a ray tracing process, and by deriving output data for data elements in each remaining region of the set of a plurality of regions of the frame based on data generated previously in respect of a preceding frame.

The technology disclosed herein extends to a data processing system configured to perform the steps of the methods of any of the embodiments disclosed herein.

Thus, a further embodiment provides a data processing system comprising:

a rendering circuit operable to render a sequence of frames to produce a sequence of frames for display, each frame representing a view of a scene of one or more objects, wherein the rendering circuit is operable in a first mode to generate output data for data elements of a region of a new frame using a ray tracing process, and wherein the rendering circuit is operable in a second mode to derive output data for data elements of a region of a frame based on data generated previously in respect of a preceding frame;

the system further comprising a control circuit operable to cause the rendering circuit to, for each one of a subset of a set of a plurality of regions of the new frame, newly generate output data for data elements in the region in respect of the new frame using a ray tracing process, and to cause the rendering circuit to derive output data for data elements in each remaining region of the set of a plurality of regions of the frame for the new frame based on data generated previously in respect of a preceding frame.

The technology in accordance with this further embodiment may include any of the features described in relation to the method embodiments and vice versa. Thus, the methods disclosed herein may include any of the steps that any of the processing circuit/circuitry of the system is described as being configured to perform, while any of the processing circuit/circuitry of the system may be configured to perform any of the steps described in relation to the methods.

The data processing system is, in an embodiment, associated and/or is in communication with and/or includes a display, and the data processing system is in an embodiment arranged to produce a sequence of frames for display, i.e. by the display. The data processing system (e.g. the display processor) may be arranged to provide the sequence of frames produced to the display. The methods described herein may further comprise providing the sequence of frames produced to a display of the data processing system. It will be appreciated that the sequence of frames may be transmitted in any suitable manner to the display, whether using wired or wireless techniques. For example, the frames may be compressed and transmitted wirelessly for display by a remote panel. In other embodiments the frames may be compressed and sent over a network, for example, and displayed remotely, e.g. for video conferencing applications.

In accordance with the technology described herein, when rendering a new frame, output data is only newly generated for data elements in respect of the new frame using a ray tracing process for some of the regions of a set of a plurality of regions of the frame. Output data for data elements in each one of the other regions of the frame is derived using data generated previously in respect of a preceding frame. This enables a frame to be rendered in a manner which still allows many of the benefits of ray tracing to be achieved, e.g. in terms of providing a more realistic image, but such that the computational processing required to be performed may be reduced (in comparison to techniques which use ray tracing to newly generate output data in respect of a new frame for the entirety of the frame). This may facilitate the use of ray tracing, for example, on lower powered and resourced devices, such as mobile or portable devices.

The output data for data elements in each remaining region of the set of a plurality of regions of the new frame is derived based on data generated previously in respect of a preceding frame. In embodiments, it will be seen that output data is newly generated by ray tracing in respect of the new frame for only a portion of the frame i.e. corresponding to a (first) subset of the plurality of regions of the frame, with output data being derived for the remainder of the new frame i.e. corresponding to one or more further subset of the set of a plurality of regions of the frame based on data previously generated (e.g. for the region) in respect of a preceding frame or frames.

In accordance with the technology described herein, the data generated previously that is used in deriving output data for data elements in each one of a remainder of the plurality of regions of the new frame may be data that was (newly) generated in relation to a given one of one or more immediately preceding frames e.g. in relation to the rendering of the region in the one of the one or more immediately preceding frames. Whether the previously generated data for different ones of the regions in the remainder of regions was generated in relation to a single, or multiple immediately preceding frames, will depend upon whether data was newly generated (by ray tracing) in relation to the entire remainder of the set of a plurality of regions of the frame in respect of a single immediately preceding frame, or whether the data was newly generated (by ray tracing) in relation to only a subset of the remainder of the set of a plurality of regions of the frame at a time, with data being newly generated (by ray tracing) for a given one of a subset of the remainder of the plurality of regions in respect of each one of the plurality of the immediately preceding frames. Thus, for a new frame, output data is newly generated using ray tracing in respect of only a portion of the frame, with output data for the remainder of the frame being determined based on data previously (newly) generated in relation to one or more immediately preceding frames.

The regions of the set of a plurality of regions of the new frame should, and in an embodiment do, cover the entire area of the frame. The regions are in an embodiment of a regular shape and size. In embodiments the regions are in the form of blocks. The blocks may be squares or rectangles. The subset of the set of a plurality of regions for which ray tracing is performed and the remaining regions may define a regular pattern, in an embodiment a checkerboard pattern. Such a process in which data is newly generated for the new frame by ray tracing in respect of only a subset of a set of regions defining a checkerboard pattern, with data for a remainder of the set of regions for the new frame being derived based on data generated previously in respect of a preceding frame, may be referred to as "checkerboard rendering".

In one example of this technique, for a first frame, new output data is generated by ray tracing in respect to one half of the frame, i.e. the black blocks of a checkerboard pattern. In the next (second) frame, new output data is generated in respect of the other half of the frame i.e. the white blocks of the checkerboard pattern. In a simple implementation, the "missing" output data for any particular frame is based on the existing output data generated in relation to the corresponding blocks of the previous frame. Thus, in the example, the output data for the black blocks, which is newly generated by ray tracing in respect of the first frame, is used in providing the output data for the black blocks in the second frame, along with the output data newly generated by ray tracing for the white blocks. In the next frame, the output data for the white blocks in the frame will be data based on that generated for the previous frame, while the output data for the black blocks will be newly generated by ray tracing in respect of the new frame, and so on. This is an example of a simple checkerboard rendering technique. In more complex implementations, the selection of the subset of regions may be modified e.g. dynamically, based upon various factors as discussed below, for example the presence of a specular region, or based on the motion of objects between frames.

Accordingly, the new frame may, in accordance with the technology described herein, be rendered using a checkerboard rendering technique. When rendering a new frame, in some embodiments, output data will be newly generated for the new frame in respect of only the black blocks or the white blocks of a set of blocks defining a checkerboard pattern using a ray tracing process, with output data for the missing blocks being derived based on data generated (e.g. for those blocks) in respect of a preceding frame or frames.

In embodiments, each region is a 2×2 pixel block or larger, and in an embodiment a 3×3 pixel block or larger. The Applicant has found that it is advantageous to use a relatively large size region e.g. block when performing checkerboard rendering for ray tracing. The use of larger checkerboard blocks has been found, for example, to improve spatial locality for ray tracing.

In embodiments a frame refresh rate is used in determining a size of the regions of the set of a plurality of regions. The frame refresh rate may correspond to a display refresh rate. It has been found that where the refresh rate is lower, then the size of regions e.g. blocks is advantageously reduced, so as to reduce potentially visible artefacts, whereas for higher refresh rates, larger regions can be used without having significant perceptible effect on the quality of the resulting image. In embodiments, the size of the regions is selected dependent upon the frame refresh rate such that a relatively larger region size is used for relatively higher refresh rates and a relatively smaller region size is used for relatively lower refresh rates. The size of the regions may in an embodiment be selected within the range described above as it varies i.e. such that each region is always at least a 2×2 block or larger, or in an embodiment a 3×3 block or larger. It will be appreciated that the region size may alternatively or additionally depend upon factors other than frame refresh rate.

The subset of regions in relation to which output data is newly generated for the new frame may be any subset of the set of a plurality of regions. This subset of regions may be referred to as a "first" subset of the regions. The "first" subset of regions in an embodiment comprises a plurality of regions. In embodiments the subset is one of N subsets of regions within the set of a plurality of regions, each subset in an embodiment comprising a plurality of the regions. The (first) subset of regions in relation to which output data is newly generated for the new frame using a ray tracing process is (only) one of the subsets of regions. The method may comprise, for each new frame, generating new output data for data elements using a ray tracing process in relation to the regions of only one of the N subsets of regions, and deriving output data in respect of data elements in the regions of each one of the other subsets of regions based on data generated previously in respect of one or more preceding frame. The previously generated data in respect of the regions in a given subset of regions of each one of the other subsets of regions is data which was (newly) generated in one of the N−1 immediately preceding frames. In any given new frame, data is only newly generated by ray tracing in relation to a subset of the regions (in the new frame).

It will be understood that output data is newly generated by ray tracing for data elements in any given region in the set of the plurality of regions only once every N frames. In a simple example, where the set of a plurality of regions is divided into two subsets, new output data is generated by ray tracing in relation to the 50% of the set of a plurality of regions in respect of a given new frame. The output data for the data elements in each region of the other subset of regions of the frame is based on data which was (newly) generated by ray tracing in relation to the region in an immediately preceding frame. Where the set of a plurality of regions is divided into three subsets, the output data for data elements in regions in each one of the subsets of regions which is not newly generated by ray tracing in relation to a given new frame is derived based on data (newly) generated for the data elements of the region in the applicable one of the preceding two frames, in relation to which the data was newly generated by ray tracing for the subset of regions to which the region belongs. In embodiments, the same regions (and subsets of regions) are used for each new frame.

The number of regions in each subset of the group of N subsets may be equal. In embodiments the total area of the frame covered by the regions in each subset is equal. Where the regions define a regular array e.g. a plurality of rows and columns, the regions may be assigned to the subsets such that every Nth alternate region (e.g. along any column or row of the array) is allocated to a different one of the N subsets. Alternatively, a non-linear pattern may be used to assign regions to subsets. For example, where N is an even number, regions from the set of regions within the new frame may be considered in groups, each forming an N/2× N/2 array, with one region from each group being assigned to each particular subset. In this way, the perceived effect of only generating new data by ray tracing in respect of a particular region every N frames may be reduced, as new data will be generated in respect of a neighbouring, or near neighbouring regions in each frame. In a simple case, in which N=2, this will result in the subsets of regions defining a checkerboard pattern i.e. with the subsets of regions corresponding to the white and black blocks of the checkerboard. However, the subsets of regions are determined, in embodiments in which the total area of the frame covered by the regions in each subset is equal, for each frame, new data will be generated for the new frame using a ray tracing process in relation to 1/N of the area of the frame.

It is envisaged that the way in which regions are assigned to the subsets may or may not be predetermined, and, at least in some situations, may be modified dynamically based upon one or more factors. One such factor is proximity to a specular region, as described below. Another such factor is the motion of objects between frames, as described below.

Checkerboard rendering techniques may be used to provide rendering at different levels of quality depending upon the parameters used in the technique. Checkerboard rendering may be performed at differing rates. It will be appreciated that the parameter "N" will define a "rate" of the checkerboard rendering i.e. after how many consecutive frames all data in the frame will have been (newly) generated by a ray tracing process. Thus, the larger the value of N, the lower the rate of checkerboard rendering. i.e. the lower the proportion of regions for which data is newly generated in respect to a given frame. Reducing the rate of checkerboard rendering will reduce the graphics processing load, but will result in a relatively lower quality rendered output frame, and vice versa. For example, checkerboard rendering may be performed where N has any value in the range of 2-4. Standard checkerboard rendering may be defined as checkerboard rendering performed with N=2. In such techniques new data is generated by ray tracing in respect of the "black" and "white" blocks of the checkerboard pattern in alternate successive frames. Higher values of N may provide relatively lower quality, i.e. (lower rate), checkerboard rendering.

The output data that is newly generated or derived for a region in accordance with the technology described herein is in respect of data elements e.g. pixels in the region. References to "output data" herein should be understood in this way, unless the context demands otherwise. The output data is in an embodiment indicative of a colour for the data element e.g. colour value, such as an RGB or RGBα value. It will be appreciated that output data may not necessarily be generated or derived in respect of each data element e.g. pixel in a region of the frame. Checkerboard rendering may be performed to differing levels of resolution. For example, the output data which is newly generated by ray tracing may be generated at different levels of resolution i.e. such that data is generated in respect of differing proportions of data elements e.g. pixels within those regions for which data is newly generated by ray tracing within the frame.

The newly generated output data for regions in the (first) subset of regions of the new frame is generated using a ray tracing process. Any suitable and desired ray tracing process can be used for this. In one embodiment, a "full" ray tracing process that involves casting a ray of light from a viewpoint, (which may be referred to as a "camera"), through each data element e.g. pixel considered in an image plane is used. The process determines, for each ray, a closest object in a scene that the ray intersects. The point of intersection may be referred to as a "first intersection point" of the ray. Thus, a full ray tracing process may involve determining the intersection of rays passing through respective data elements of the frame with objects in a scene and then determining output data for the data elements using the intersection data. The output data for the data elements may comprise colour data for the data elements. Each ray considered that is cast from the viewpoint through a data element in this manner may be referred to as a "primary ray". The process may involve casting further (secondary) rays from the respective first intersection points of primary rays with objects in the scene, analysing the intersections of the secondary rays with objects in the scene, and additionally using the intersection data for the secondary rays in determining the output data for data elements. For example, for each primary ray, and depending upon the material of the surface of the object, one or more of a refracted and reflected secondary ray may be cast from the first intersection point of the ray with an object in the scene. A shadow secondary ray may be cast from the first intersection point to a light source. Determining the output data for the data elements takes into account a material of the surface of objects intersected by the rays passing through the data elements (and any secondary rays derived therefrom).

In another embodiment, a so-called "hybrid" ray tracing process is used, in which only some of the steps of a full ray tracing process are performed. For example, the first intersection of each ray with an object in the scene may be determined through rasterisation (rather than by casting a ray from the viewpoint into the scene). The rasterisation may involve performing a rasterisation pass over some or all of the new frame. In some exemplary processes, a first rasterisation pass is performed over the frame in order to determine which object e.g. primitive is closest to the viewpoint (camera) at each point in the frame. In this way, a rasterisation pass may be used to define a first intersection point for use in ray tracing for each data element e.g. pixel (i.e. the intersection of the ray passing through the data element e.g. pixel with the first i.e. closest object encountered). The hybrid ray tracing process may involve casting one or more secondary rays from the determined first intersection points, in the manner described above in relation to "full ray tracing". The method may then similarly comprise analysing the intersections of the secondary rays with objects in the scene, and additionally using the intersection data for the secondary rays in determining the output data for data elements.

As used herein, a "ray tracing process" is considered to encompass processes in which all steps of a full ray tracing process are performed, or processes in which only some of the steps of a full ray tracing process are performed, for example with another e.g. rasterisation process or processes being used to implement the other steps of the full ray tracing process.

In some embodiments, the output data for data elements in each one of the subset of a plurality of regions which is newly generated in respect of the new frame using ray tracing is based on an intermediate data structure obtained by rasterisation, such as a "G-buffer". The intermediate data structure may be indicative of a first intersection of each one of a plurality of rays passing through respective data elements in the region with an object. The method may comprise determining an intermediate data structure indicative of the first intersection of each one of a plurality of rays passing through respective data elements in the region with an object ("first intersection data") using rasterisation, wherein the output data which is newly generated for the data elements in the region using ray tracing is based on the intermediate data structure.

It will be appreciated that an intermediate data structure indicative of (first) intersection data, e.g. obtained by rasterisation, may or may not be specifically in respect of the particular region provided that it can be used to provide intersection data for data elements in the region. For example, the intermediate data structure may be in respect of the frame as a whole e.g. all data elements therein. In an embodiment, however, the intermediate data structure comprises first intersection data in respect of regions corresponding to regions of the subset of the plurality of regions for which output data is to be newly generated using ray tracing. Thus, in embodiments the first intersection data is in respect of regions defining at least a portion of a checkerboard pattern. The intermediate data structure may comprise first intersection data only in respect of the subset of the plurality of regions for which output data is to be newly generated for the frame, or in relation to each region of the frame.

In embodiments, the intermediate (e.g. rasterised) data structure for any given or each new frame comprises first intersection data in respect of each region in a subset of the set of a plurality of regions, which subset corresponds to the subset of the plurality of regions for which output data is to be newly generated for the frame using the ray tracing process, and in an embodiment comprises first intersection data only in respect of the subset of regions. In embodiments, the method may comprise obtaining an intermediate data structure for a given or each new frame using rasterisation in respect of the subset of the plurality of regions of the new frame, and newly generating the output data in respect of the subset of the plurality of regions based thereon using ray tracing. In embodiments in which the intermediate data structure is in respect of only the subset of the plurality of regions, when the next new frame is to be rendered, the intermediate data structure may be newly generated by rasterisation in respect of only the new subset of the plurality of regions for which output data is to be newly generated by ray tracing, and so on.

While the use of an intermediate data structure has been exemplified in relation to such a structure which is indicative of intersection data, it will be appreciated that other intermediate data structures may alternatively or additionally be used in obtaining the newly generated output data using a ray tracing process, whether generated by ray tracing, or through another technique e.g. rasterisation. One example of such an intermediate data structure is an "acceleration data structure. An acceleration data structure is indicative of the geometry of objects in a scene and may be used to facilitate determining the ray intersection data. The method may comprise using an intermediate data structure indicative of an acceleration data structure, and/or an intermediate data structure comprising data relating to an acceleration data structure in obtaining the newly generated output data using the ray tracing process. Thus, the techniques described herein may involve using one or both of an intermediate data structure indicative of an acceleration data structure, and an intermediate data structure comprising data relating to an acceleration data structure. For example, where the acceleration data structure comprises a tree structure, the intermediate data structure may comprise data indicative of the way in which the structure may be traversed.

The data for the remainder of the set of a plurality of regions of the frame e.g. the or each subset of regions ("missing regions") which is not newly generated using ray tracing in relation to a new frame, may be derived based on the data (newly generated) in relation to one or more immediately preceding frames in any suitable manner. The data upon which the derived data for a region is based, is data which was newly generated as part of a ray tracing process in respect of a preceding frame. The data upon which the derived data is based may or may not itself be obtained using a ray tracing process. For example, it is envisaged that the data might be an intermediate data structure obtained by rasterisation or some other technique as part of a "hybrid" rasterisation process.

In a simple arrangement, for a given region, the output data newly generated by ray tracing in relation to the region in respect of a one of the one or more immediately preceding frames may simply be reused. Alternatively, some form of interpolation may be performed to derive the output data for the new frame based on previously generated output data.

In some embodiments the rendering technique is arranged to derive the output data for each region of the remainder of the set of a plurality of regions of the frame based on data generated previously in respect of a preceding frame using data indicative of the motion of objects between frames obtained by the tracking of the motion of the one or more objects between frames. The data indicative of the motion of objects may be indicative of the motion of objects between frames in the region. The output data for each region derived using the motion data may be based on output data generated previously in respect of a preceding frame. Depending upon the motion of objects between frames, the output data derived in respect of a given data element in a region of the new frame may be based upon output data previously generated in respect of the same or a different data element in respect of the preceding frame. In embodiments, the motion data may be used to identify one or more data elements from a previous frame whose output data may be reused to provide output data for one or more data elements of a region in the new frame. For example, where an object is moving to the right, when identifying a data element from the previous frame whose output data may be reused in respect of a data element in the new frame, a data element from the previous frame which is to the left of the data element in the new frame may be selected. These data elements may correspond to the same position on the moving object in the respective frames.

In any of the embodiments of the technology described herein, the amount of motion of one or more objects e.g. in a region may be determined based on a set of one or more motion vectors obtained in respect of the or each object e.g. in the region. The motion vectors may be determined in any suitable manner. A first pass through the frame may be performed in order to determine the set of one or more motion vectors in respect of the or each object. Modern APIs have the ability to record the identity of individual objects within a frame, which can then be used to track the motion of the objects between frames, and hence derive motion vectors for the objects. The method may comprise providing each object appearing within the sequence of frames with an identifier, and using the identifier to track the motion of the or each object between frames.

As mentioned above, a ray tracing process may involve one or more intermediate data structures being generated (whether by ray tracing or otherwise) in obtaining the final output data for data elements e.g. pixels. The previously generated data, (which was newly generated in respect of a preceding frame), which is used in deriving output data for a region in the remainder of the set of a plurality of regions may or may not be output data for data elements of the region. In some embodiments, rather than reusing output data previously generated e.g. for a region in respect of a preceding frame, or performing interpolation based thereon, the method may comprise using an intermediate data structure previously (newly) generated e.g. in relation to the region in respect of a preceding frame to generate output data for the region in respect of the new frame. The method may comprise generating the output data for the region in respect of the new frame based on the previously generated intermediate data structure using a ray tracing process. For example, the intermediate data structure may be an acceleration data structure, or may comprise data relating thereto. This may provide a system in which some ray tracing processing is still performed in deriving the output data for regions in the remainder of the frame, but with the amount of ray tracing processing required reduced by reusing an intermediate data structure generated in respect of a previous frame. The previously generated intermediate data structure used is generated as part of a ray tracing process. The intermediate data structure may or may not itself be generated by ray tracing.

It will be appreciated that the previously generated data upon which the derived data for a remaining region is based may or may not have been generated specifically in respect of the particular region provided that it can be used to derive output data for the new frame for data elements in the region. Thus, a reference to the previously generated data being "for" a region should be understood to encompass the data being specifically generated for the region, or being in any manner usable to derive output data for data elements in the region. For example, the previously generated data may be in respect of the frame as a whole e.g. all data elements therein, or an area thereof. In some cases some processing may be performed to obtain the applicable previously generated data for a region. In an embodiment, however, the previously generated data comprises data in respect of regions corresponding to regions of the subset of the plurality of regions for which output data is to be newly generated using ray tracing. For example, the data may be generated as a checkerboard as described in relation to obtaining the intermediate data structure for use in newly generating data for regions of the new frame by ray tracing.

It will be appreciated that the data for each region in the subset of the set of regions of the new frame, and data for each remaining region in the set of regions, is generated using different rendering techniques. The data for each region in the subset of regions is generated using a rendering technique in which data is newly generated using a ray tracing process. The output data for each remaining region is obtained using a rendering technique in which output data is derived based on data previously generated in respect of a previous frame.

In contrast to those regions within the subset of the set of a plurality of regions for which output data is newly generated in respect of the new frame, the output data which is derived in respect of regions in the remainder of the frame is based at least in part upon data previously generated i.e. in respect of one or more preceding frames, even if some data is newly generated in respect of the new (current) frame in order to provide the output data.

The output data for data elements in each region of the subset of a plurality of regions of the new (current) frame (for which output data is newly generated by ray tracing in respect of the new frame) is newly generated in respect of the new frame, and may be based only on data determined in respect of the new frame i.e. the current frame. The output data is, in embodiments, not based on any data previously generated for the region in respect of any preceding frame. Thus, where the output data for data elements in the subset of regions is generated by ray tracing based on an intermediate data structure, that data structure may also be newly generated in respect of the new (current) frame. However, in other embodiments, an intermediate data structure previously generated may be reused e.g. data indicative of the traversal of an acceleration structure.

In accordance with the technology described herein, the selection of the subset of regions for which output data is to be newly generated in respect of the new frame may be predetermined. For example, as discussed above, each region of the set of a plurality of regions may be assigned to a given one of a plurality of subsets of regions, with new output data being generated for a given new frame in respect of only one of the N subsets of regions. However, it is envisaged that the assignment of regions to the subsets may be dynamically modified based on certain factors. One such factor is the presence of a specular region in a frame. Another such factor is the motion of objects between frames.

A specular region is a region of the frame in which rays cast from a viewpoint through data elements in the region will undergo specular reflection, being reflected at the same angle to a normal to the surface as the incident ray, but on the opposing side of the normal in a plane formed by the incident and reflected rays. Thus, the reflection occurs in a mirror-like fashion. A "specular region" as used herein may therefore refer to a region at which reflection of light occurs in a mirror-like manner i.e. such that the incident light is reflected in a single outgoing direction, with the angle of reflection being equal to the angle of incidence.

It has been found that where a specular region is present in a frame, it is desirable for output data to be newly generated using ray tracing in respect of an area around the specular region. A specular region, particularly in which specular reflection of a bright light source off a mirror-like surface of an object occurs, may generate highly visible reflections. Thus, the region may be highly noticeable to a viewer. Furthermore, a specular reflection may be highly dependent upon the point of view e.g. the position of the viewpoint (camera). Thus, a specular region may move a significant amount between frames. This may make it more difficult to reuse previously generated data when rendering a specular region. Newly generating output data using ray tracing in respect of an area around a specular region may be achieved in various manners.

The method may comprise determining whether a specular region is present in a frame, and, when a specular region is detected in a new frame, identifying an area of the current frame and/or of one or more subsequent frame based on the location of the specular region, and using the area to modify the subset of regions of the set of a plurality of regions for which output data is to be newly generated using a ray tracing process in respect of the current frame and/or one or more subsequent frame. The modification of the subset of regions in an embodiment comprises adding one or more extra regions to the subset. The extra regions may be considered to be subjected to additional processing i.e. additional processing by ray tracing, in comparison to the processing to which they would have been subjected without modification of the subset of regions. The regions are regions which would otherwise have had output data derived based on previously generated data. The one or more extra regions may be regions which are at least partially located within the identified area. Any suitable algorithm may be used to determine whether a region which is only partially within the identified area should be subjected to the additional processing or not. The detection of a specular region in a current new frame may trigger the selection of one or more extra regions to be subjected to the additional processing in the current frame, and/or in relation to one or more subsequent frames. The detection of a specular region may be based on a comparison of the angles of incidence and reflection of rays at a surface, e.g. the similarity between the angles, and in an embodiment the properties of the surface of the object e.g. how smooth or mirror-like the surface is. For example, the angle of incidence of a ray incident upon the surface e.g. a primary ray from a viewpoint (e.g. camera) may be compared to the angle of reflection of the ray (e.g. the angle of reflection of a secondary ray cast from the point of incidence of the primary ray with the surface to a light source). Alternatively or additionally, detection of a specular region may be based on a brightness of the region relative to other regions. A specular region will typically be significantly brighter than other e.g. surrounding regions.

One way in which to select regions for additional processing is to modify the way in which regions are assigned to subsets for performing checkerboard rendering. The method may comprise, for the current frame and/or a subsequent frame or frames, adding the selected one or more extra region to the subset of the set of a plurality of regions of the frame for which output data is to be newly generated in respect of the frame. The selected one or more extra region may be one or more regions for which data would otherwise be derived based upon previously generated data (e.g. which were to form part of a subset of regions of the frame for which data was to be so derived). The method may in an embodiment comprise removing one or more regions from the subset e.g. if it is desired to maintain the total number of regions in the subset for which data is to be newly generated by ray tracing unaltered. In a simple arrangement, when a specular region is detected in a frame, the "checkerboard" rendering layout in the identified area is thus disabled. Alternatively, once rendering has been performed as originally planned i.e. as would be the case in the absence of the specular region being detected, e.g. using the original assignment of regions to subsets, additional processing of the selected one or more regions may be performed using a ray tracing process.

It will be seen that the additional processing of extra regions by ray tracing in response to detection of a specular region in a frame may occur in relation to the same frame in relation to which the specular region is detected (i.e. a current frame) and/or a subsequent frame or frames. In an embodiment the additional processing is performed at least in relation to the current frame. Performing the additional ray tracing processing in relation to a subsequent frame or frames, and not the current frame, may lead to some errors in the rendering of the current frame. In embodiments, the additional processing in response to the detection of a specular region in a current frame is performed alternatively or additionally (to performing such additional processing in relation to the current frame) in respect of one or more immediately subsequent frames.

The area of the frame used to select one or more additional region for additional ray tracing processing may be identified based upon the location of a detected specular region in any suitable manner. The area may include the specular region and in an embodiment a selected e.g. predetermined, area around the specular region. Where the additional ray tracing processing is to be performed in relation to a subsequent frame or frames (in comparison to a frame within which the specular region is detected), the area may be selected taking into account a predicted movement of the detected specular region. This may ensure that the area includes the expected location of the specular region in the subsequent frame or frames. Alternatively, the area may simply be defined to be sufficiently large to try to encompass any possible movement of the specular region between frames. Such arrangements may avoid the need to attempt to track the movement of specular regions between frames, which may be computationally expensive.

Alternatively or additionally, the method may comprise using data indicative of the motion of objects between frames obtained by the tracking of the motion of the one or more objects between frames to modify the subset of regions of the set of a plurality of regions for which output data is to be newly generated using a ray tracing process in respect of the current frame and/or one or more subsequent frame. The modification of the subset of regions may comprise adding one or more extra regions to the subset and/or removing one or more region from the subset. The data indicative of the motion of objects may be indicative of the motion of objects between frames in the respective regions. In some embodiments the subset of regions may be modified based on an amount of motion of objects between frames e.g. in the respective regions. It will be appreciated that where there is no motion of objects in a region, it may be more appropriate to derive output data for data elements in the region based on data generated previously in respect of a previous frame. For example, in some embodiments, output data may simply be reused. Such a region may then be removed from the subset. In contrast, where there is motion of objects within a region, or at least where the amount of motion exceeds a given threshold, it may be more appropriate to newly generate output data for the data elements in the region using a ray tracing process. Such a region may then be added to the subset.

As described in relation to specular regions, one way in which to select regions for additional processing is to modify the way in which regions are assigned to subsets for performing checkerboard rendering. The method may comprise, for the current frame and/or a subsequent frame or frames, adding one or more extra region to the subset of the set of a plurality of regions of the frame for which output data is to be newly generated in respect of the frame where the amount of motion in the or each region exceeds a given threshold. The selected one or more extra region may be one or more regions for which data would otherwise be derived based upon previously generated data (e.g. which were to form part of a subset of regions of the frame for which data was to be so derived). The method may in an embodiment comprise removing one or more regions from the subset e.g. if it is desired to maintain the total number of regions in the subset for which data is to be newly generated by ray tracing unaltered. In a simple arrangement, when an amount of motion exceeding a given threshold is detected in a region, the "checkerboard" rendering layout in the identified region is thus disabled. Alternatively, once rendering has been performed as originally planned i.e. as would be the case in the absence of an amount of motion of objects being considered, e.g. using the original assignment of regions to subsets, additional processing of the selected one or more regions may be performed using a ray tracing process.

The methods described herein are used to produce a sequence of frames for display.

The technology described herein is in an embodiment implemented in and as part of an overall data processing system that includes one or more of: a host processor (central processing unit (CPU)), a graphics processor (processing unit), a display processor, a video processor (codec), a system bus, and a memory controller.

The processing circuitry and circuits of the technology described herein may, e.g., form part of the graphics processor (processing unit), the display processor and/or another suitable component of the data processing system, e.g. as described above, or may otherwise be provided in the data processing system. It may comprise programmable and/or fixed function processing circuits/circuitry, and/or may comprise dedicated processing circuits/circuitry and/or processing circuits/circuitry used for other processing as well, as desired.

The host processor may execute applications that can require graphics processing by the graphics processor, and send appropriate commands and data to the graphics processor to control it to perform graphics processing operations and to produce graphics processing (render) output required by applications executing on the host processor (including in the manner of the technology described herein).

Similarly, there is in an embodiment an application on the host processor that indicates a requirement for performing processing operations in the manner of the technology described herein, which requirement is then recognised by, e.g., the driver executing on, the host processor, with the, e.g. driver on, the host processor then operating to instruct the graphics processor to render data accordingly.

Similarly, the data processing system in an embodiment has or is in communication with a memory in which frames generated, e.g. by the graphics processor, may be stored, e.g. for subsequent processing, e.g. display (e.g. via the memory controller). Thus, in an embodiment, the data processing system comprises, and/or is in communication with, one or more memories and/or memory devices that store the data described herein, and/or that store software for performing the processes described herein.

The graphics processor can include, and in an embodiment does include, any one or more, and in an embodiment all, of the processing stages that a graphics processor (processing unit) can normally include. Thus, for example, the graphics processor in an embodiment includes a primitive setup stage, a rasteriser and a renderer. In an embodiment the renderer is in the form of or includes a programmable fragment shader.

The graphics processor is in an embodiment a tile-based graphics processor comprising a tile buffer for storing tile sample values and/or a write out unit that operates to write the data in the tile buffer (e.g. once the data in the tile buffer is complete) out to external (main) memory (e.g. to a frame buffer).

It will be appreciated by those skilled in the art that all of the described embodiments of the technology described herein can, and in an embodiment do, include, as appropriate, any one or more or all of the features described herein.

The technology described herein can be implemented in any suitable system, such as a suitably configured microprocessor based system. In an embodiment, the technology described herein is implemented in a computer and/or micro-processor based system. The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuitry/circuits) and/or programmable hardware elements (processing circuitry/circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuits, etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/or any one or more or all of the processing stages and processing stage circuitry/circuits may be at least partially formed of shared processing circuitry/circuits.

Subject to any hardware necessary to carry out the specific functions discussed above, the components of the graphics processing system can otherwise include any one or more or all of the usual functional units, etc., that such components include.

The methods described herein may be implemented using a set of one or more processors, and the systems may include a set of one or more processors. For example, where a rendering technique involves a mixture of generating new data in respect of a new frame, and deriving data based on previously generated data (whether in relation to that frame or a preceding frame), generating the new data, and deriving data based on previously generated data may be performed by the same processor i.e. the data processor, or may be performed by different processors. For example, these steps may both be performed by a processor of a graphics processing unit, or the newly generated data may be generated by such a processor, with the derived data being derived by a display processor.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display processor, or microprocessor system comprising a data processor causes in conjunction with said data processor said controller or system to carry out the steps of the methods of the technology described herein. Such a computer software carrier could be a physical storage intermediate such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory intermediate, such as a computer readable intermediate, for example, diskette, CDROM, ROM, RAM, flash memory, or hard disk. It could also comprise a series of computer readable instructions transmittable to a computer system, via a modem or other interface device, over either a tangible intermediate, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable intermediate with accompanying printed or electronic documentation, for example, shrink wrapped software, preloaded with a computer system, for example, on a system ROM or fixed disk, or distributed from a server or electronic bulletin board over a network, for example, the Internet or World Wide Web.

The or each object as referred to herein may be a primitive, such as a polygon.

A further embodiment provides a non-transitory computer readable storage intermediate storing software code which, when executing on a processor, performs a method of rendering a sequence of frames to produce a sequence of frames for display, each frame representing a view of a scene of one or more objects;

the method comprising: when a new frame in the sequence of frames is to be rendered;

the data processor rendering the new frame by, for each one of a subset of set of a plurality of regions of the new frame, newly generating output data for data elements in the region in respect of the new frame using a ray tracing process, and by deriving output data for data elements in each remaining region of the set of a plurality of regions of the frame based on data generated previously in respect of a preceding frame.

The technology in accordance with this further embodiment may incorporate any or all of the features described in relation to the earlier embodiments of the technology e.g. any of the method steps described herein.

Embodiments of the technology described herein will now be described with reference to the Figures.

The methods disclosed herein may be implemented using a data processing system, which may be as shown in FIG. 1, which is described above.

The technology described herein involves newly generating output data for data elements e.g. pixels in a subset of regions of a set of regions in a new frame using ray tracing, and deriving output data for data elements of each remaining region of the new frame based on data previously generated in respect of a preceding frame. In exemplary embodiments, the regions are in the form of blocks defining a checkerboard pattern. The rendering process may then be referred to as "checkerboard rendering".

Figure 2A:
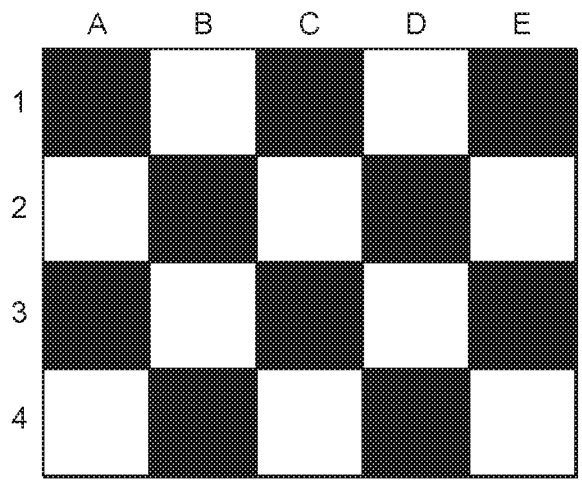
FIGS. 2A and 2B illustrate the way in which a checkerboard rendering technique may be performed, indicating, respectively, the blocks of a frame in respect of which data is newly generated by ray tracing in successive frames.
Figure 2B:
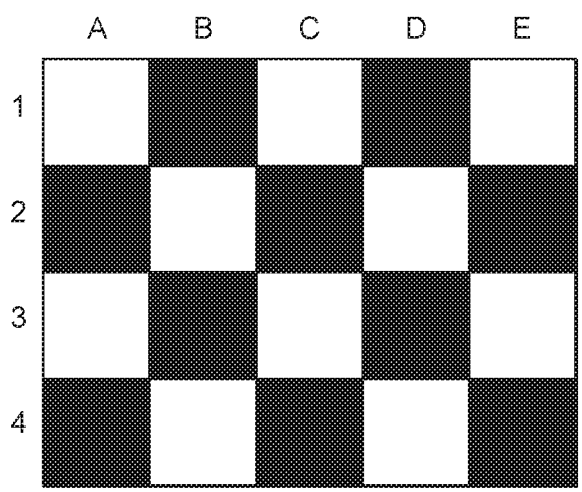

FIGS. 2A and 2B illustrate the way in which checkerboard rendering may be performed in accordance with the technology described herein. In one example of this rendering technique, for any given frame, output data is newly generated by a ray tracing process in respect of only half of a set of blocks defining a checkerboard pattern within the frame. In the next frame, output data is newly generated by a ray tracing process in respect of the other half of the blocks.

FIGS. 2A and 2B illustrate, for alternate frames, the blocks within the frame in respect of which output data is newly generated by ray tracing. The blocks for which output data is newly generated are shown in black. Thus, for first and second successive frames, the blocks within the frame for which output data is newly generated by ray tracing will be as shown in FIGS. 2A and B respectively. For the next frame, the blocks for which output data is newly generated will be as shown in FIG. 2A again. For the next frame, the blocks for which data is newly generated will be as shown in FIG. 2B, and so on. Accordingly, in alternate frames, output data is newly generated by ray tracing in respect of "odd" and "even" blocks. This may reduce the data generating effort required for a given frame e.g. by half.

For any given frame, output data for those blocks of the frame in respect of which output data is not newly generated by ray tracing for that frame, is derived based on data which was newly generated for those blocks in the preceding frame. As mentioned previously, the previously generated data may or may not have been generated specifically for the respective blocks provided that data for the blocks may be derived therefrom. In FIG. 2B, the output data for the white blocks will be derived based on data for the corresponding blocks which was newly generated in respect of the previous frame shown in FIG. 2A. The output data may correspond to the output data generated by ray tracing in respect of the previous frame, or may be otherwise based thereon e.g. being interpolated from the previous data. In some embodiments the output data may be based on previously generated data other than the output data generated in respect of the previous frame e.g. an intermediate data structure. Such embodiments are described in more detail below. In one example, the output data is derived from previously generated output data by interpolation based on tracking the movement of objects e.g. primitives between the frames. This may be achieved by recording the identity of individual objects e.g. primitives within a frame, to enable the objects to be tracked as they move between frames. Such functionality is provided by modern APIs, such as Vulcan. Motion vectors may be derived for the objects.

The checkerboard rendering may be performed to different levels of quality. The technique illustrated by reference to FIGS. 2A and B may be considered to be "standard" checkerboard rendering. One example of a lower quality checkerboard rendering technique would operate in a similar manner to that described by reference to FIGS. 2A and 2B, but, rather than newly generating output data by ray tracing for half of the blocks in any given frame, data would be newly generated by ray tracing in relation to a smaller fraction of the blocks. For example, new output data may be generated in relation to one third of the blocks. In such arrangements, output data will only be newly generated by ray tracing in respect of a given block every three frames, with data for the block in the intervening frames being obtained based e.g. upon the last newly generated output data for that block. Such techniques may be considered to provide checkerboard rendering at a lower "rate".

In general, a rate N of a checkerboard rendering technique may be defined, wherein data for a given block is newly generated every N frames, where N>2. For standard checkerboard rendering N=2. For the lower quality checkerboard rendering exemplified above, in which data is newly generated by ray tracing in respect of a given block every 3 frames, N=3. Of course, checkerboard rendering may be performed at yet lower quality, using higher values of N, e.g. N=4 or even N=5.

One example, where N=4, is shown in FIGS. 3A-D. FIGS. 3A-D illustrate the blocks within a frame for which data is newly generated by ray tracing in each one of four successive frames. These blocks are shown in black. Data is newly generated in respect of ¼ of the blocks for each frame. The selected regions illustrate the non-linear pattern used to select blocks for data to be newly generated by ray tracing in a given frame. It has been found that selecting blocks in respect of which data is to be newly generated by ray tracing in any given frame using a non-linear pattern may reduce certain artefacts. For example, rather than generating new data for blocks A1, B1, C1, D1 in successive frames, the blocks may be considered in groups forming a 2×2 grid, with new data being generated by ray tracing in respect of different ones of the blocks within the group in successive frames e.g. A1, B2, B1, A2 etc.

In another example, checkerboard rendering may be performed at lower resolution. For example, for a given block for which data is newly generated by ray tracing in a frame, i.e. a black block, data may be newly generated by ray tracing in respect of only half of the pixels, with data being derived for the other pixels in some manner e.g. based upon data generated in relation to a previous frame, or through interpolation within the frame etc.

While in the examples illustrated in FIGS. 2A and B, and FIGS. 3A-D, the subset of regions for which data is newly generated by ray tracing in a new frame are predetermined, it will be appreciated that in some embodiments the selection of the regions may be modified dynamically based on various factors. One such factor is the presence of a specular region as discussed below. Another such factor is the motion of objects between frames. As discussed below, for each new frame, motion vectors may be generated in respect of objects appearing in the frame. The objects may be primitives, such as polygons. The motion vectors are generated based on tracking the movement of objects between frames. The identity of each individual object is recorded to enable the objects to be tracked between frames. The generation of motion vectors for each object may be performed by the CPU or GPU. It will be appreciated that where there is no motion of objects between frames in a region, it may be more appropriate to reuse previously generated data for the region, while where there is motion of objects between frames in a region, or at least where such motion exceeds a given threshold, it may be more appropriate to newly generated output data for the region using a ray tracing process. The selection of the subset of regions for which output data is to be newly generated using ray tracing may be modified based on the motion of objects between frames within the regions. For example, where there is no motion of objects within a region between frames, the region may be removed from a subset of regions for which data is to be newly generated in respect of the new frame using ray tracing, while, where there is motion (or at least a given amount of motion) of objects between frames in a region, the region may be added to the subset of regions for which output data is to be newly generated.

The technology herein involves newly generating data for the subset of regions using a ray tracing process.

Figure 4:
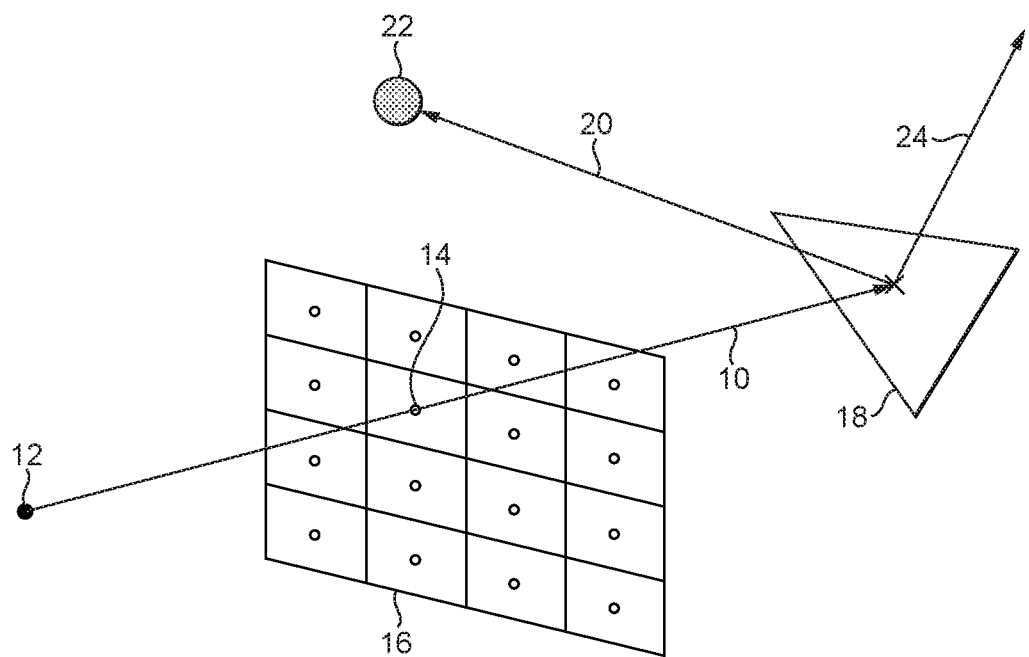
FIG. 4 is a schematic diagram illustrating a ray tracing process.

FIG. 4 illustrates an exemplary ray tracing process. This process is illustrative of a full ray tracing process. A ray 10 (the "primary ray") is cast backward from a viewpoint 12 (e.g. camera position) through a pixel 14 in an image plane 16. The point X at which the ray first intersects an object 18 e.g. primitive in a scene is identified i.e. the first intersection point. This first intersection will be with the object in the scene closest to the pixel. In an embodiment, a secondary ray in the form of shadow ray 20 may be cast from the first intersection point X to a light source 22. The casting of secondary rays may be used where it is desired to add shadows to the image. A secondary ray may be cast in the direction of each light source, (and, depending upon whether or not the light source is a point source, more than one secondary ray may be cast back to a point on the light source. It will be appreciated that, in this example, only a single bounce of the ray 10 is considered, before tracing the reflected ray back to the light source. However, a higher number of bounces may be considered if desired, although this will increase the complexity of the ray tracing processing. With each interaction of a ray with an object, some of the light will be absorbed, and so reflection off larger numbers of surfaces of objects will have a limited effect on the final output value obtained for a pixel. A limited number of bounces of a ray may therefore be considered without significant impact on the resulting quality of output data obtained.

Depending upon the material of the surface of the object 18, another secondary ray in the form of reflected ray 24 may be traced from the intersection point X through the object 18. If the object is, at least to some degree, transparent, then a refracted secondary ray may be considered. The output data for the pixel 14 i.e. a colour value (e.g. RGB value) thereof, may be determined taking into account the interactions of the primary, and any secondary ray(s) cast, with objects in the scene. The same process is conducted in respect of each pixel to be considered in the image plane 16.

In general, where secondary rays are considered, if the surface of an object intersected by the primary ray is a specular surface i.e. is a smooth surface which can be assumed to act like a mirror, a single reflected secondary ray may be cast in the direction of reflection by the surface. For a glossy i.e. irregular surface, which results in diffuse reflection, multiple secondary reflected rays may be cast, e.g. according to a distribution function defined by the properties of the reflective material of the surface. This may, for example, result in rays being cast in random directions for a truly glossy surface, or, for a more specular surface, in directions around the direction in which the single reflected ray would be reflected if the surface were truly specular i.e. mirror-like.

To simplify the calculation, a single secondary ray may be selected for use in determining output data based on the distribution function, even where the material of the surface of the object is not truly specular. Various techniques may then be used to compensate for any loss of quality. For example, multiple primary rays may be cast in respect of a given pixel, with only one of a plurality of secondary rays arising at a first intersection point of the primary ray being considered in respect of each primary ray. A final output value for the pixel may then be determined based on the output data determined in respect of each primary ray cast through the pixel, i.e. based on the interaction of the primary ray, and its associated secondary ray, with objects in the scene.

A flow chart illustrating the steps of the ray tracing process will now be described by reference to FIG. 5.

When performing ray tracing, for each primary ray i.e. each ray passing from the viewpoint through a respective pixel in the image plane, the first intersection of the ray with an object in the scene must be determined. To facilitate ray tracing, various intermediate data structures may be generated. For example, an intermediate data structure indicative of the geometry of objects in the scene may generated. Such an intermediate data structure may be referred to as an "acceleration structure". The use of an acceleration structure may facilitate determining the first intersection data for the primary rays associated with pixels in the image plane, avoiding the need to test every object in the scene for intersection with the primary ray. The acceleration structure may enable a subset of the objects to be identified which a primary ray is most likely to intersect. A further intermediate data structure may be generated comprising data to facilitate traversal of the acceleration structure.

The acceleration structure may take on various forms, for example a Bounding Volume Hierarchy (BVH). A BVH is a tree structure in which the complete scene is enclosed in an axis-aligned bounding box (AABB), and recursively subdivided into two sub-AABBs according to various subdivision schemes (e.g. same number of primitives per child, based on traversal cost, etc.). The BVH type acceleration structure will have a number of leaves, each of which is associated with only a small number of objects of the scene. A primary ray may be tested against the hierarchy of AABBs in the BVH until a leaf node is found. It is then only necessary to test the objects associated with the particular leaf node for intersection with the primary ray.

Figure 5:
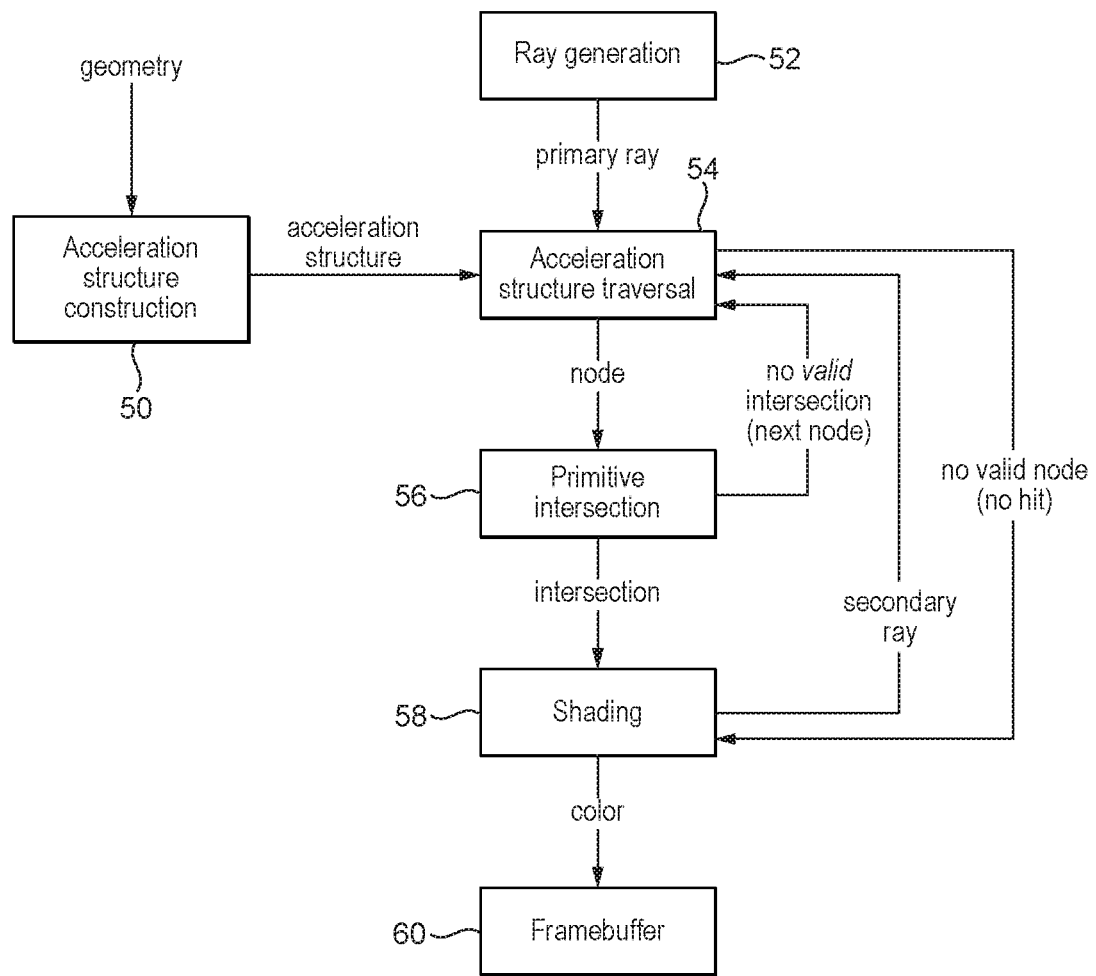
FIG. 5 is a flow chart illustrating one embodiment of a full ray tracing process.

Referring to FIG. 5, in step 50, the geometry of the scene is first analysed and used to obtain an acceleration structure (step 50), for example in the form of a BVH tree structure, as exemplified above. A primary ray is generated, passing from a camera through a particular pixel in an image plane (step 52). The primary ray traverses the acceleration structure (step 54), and a leaf node which contains objects which the ray potentially intersects with can be identified. It is then determined whether the ray intersects any of the objects e.g. primitives in this leaf node (step 56). If no (valid) object can be identified which the ray intersects in the node, the method returns to step 54, and the ray continues to traverse the acceleration structure and the next leaf node which may contain an object with which the ray intersects is identified, and a test for intersection performed according to step 56. It will be appreciated that a further intermediate data structure may be generated comprising data relating to the traversal of the acceleration structure. For example, this may enable the acceleration structure to be traversed starting at a lower level in the tree, rather than at the root, in the example where the acceleration structure is a BVH.

Once an object is identified which the ray intersects, the process proceeds to step 58, and the pixel is shaded, taking into account the properties of the surface of the object at the intersection point. In an embodiment, depending upon the complexity of the ray tracing process, one or more secondary ray may be generated emanating from the intersection point, as illustrated in FIG. 4 (e.g. shadow ray, refraction ray etc.). Steps 54, 56 and 58 are then performed in relation to the or each secondary ray.

A shaded colour for the pixel is then determined based on the shading of the pixel determined in step 58 in respect of the primary ray, and any secondary rays considered. The shaded colour for the pixel is then stored in the frame buffer (step 60).

If no (valid) node can be identified in step 54 which may include an object intersected by a given ray (whether primary or secondary), the process moves to step 58, and shading is performed.

This process is performed for each pixel in the image plane e.g. frame.

In embodiments using an acceleration structure, a further intermediate data structure may be generated to facilitate traversal of the acceleration structure In an alternative embodiment, a ray tracing process may be used, in which only some of the steps of the full ray tracing process described in relation to FIGS. 4 and 5 are performed. Such a ray tracing process may be referred to as a "hybrid ray tracing process". In one exemplary hybrid process, an intermediate rasterisation data structure is generated indicative of the first intersection point (i.e. the intersection with the closest object in the scene) of each primary ray passing from a viewpoint through a pixel in the image plane.

Figure 6:
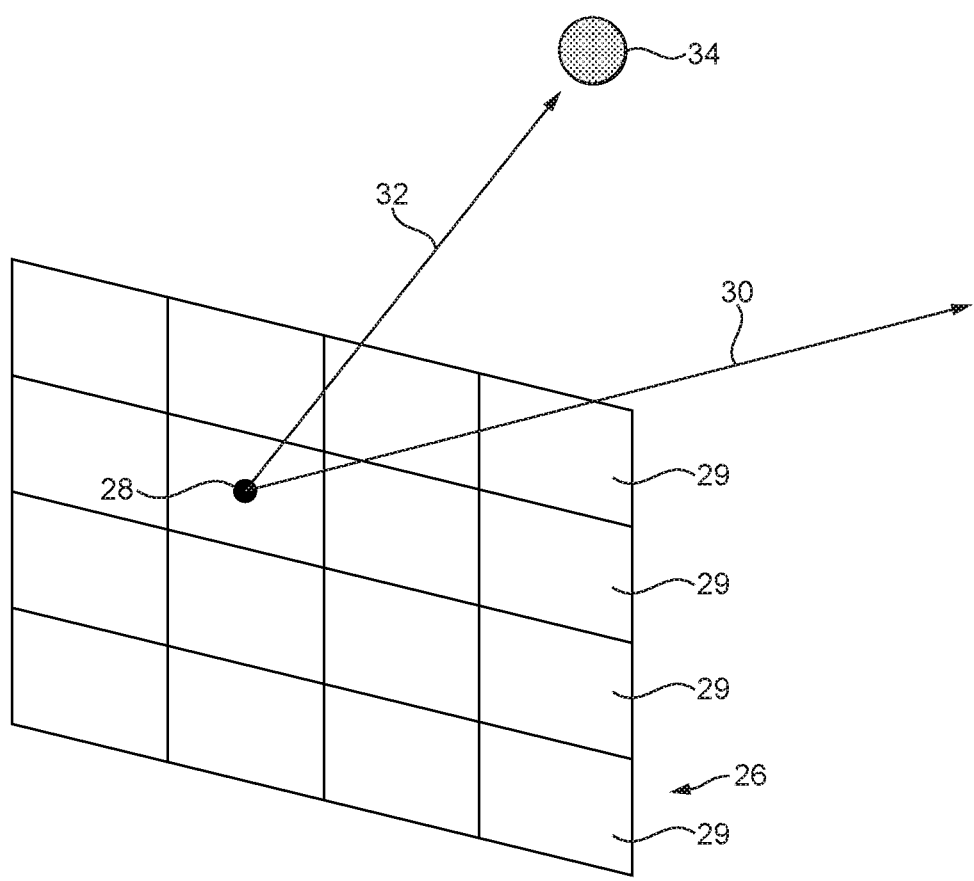
FIG. 6 is a schematic diagram illustrating a hybrid ray tracing process.

As shown in FIG. 6, the first intersection point 28 for each pixel 29 in the image plane may be stored in an intermediate data structure known as a "G-buffer" 26. Thus, the process of generating a primary ray for each pixel, and identifying the first intersection point of the primary ray with an object in the scene, is replaced with an initial rasterisation process to generate the "G-buffer". The G-buffer includes information indicative of the depth, colour, normal and surface properties for each first (closest) intersection point in the image plane i.e. frame. Secondary rays e.g. shadow ray 32 to light source 34 and refraction ray 30 may then be cast starting from the first intersection point 28, and the shading of the pixels determined based on the properties of the object first intersected, and the interactions of the secondary rays with objects in the scene.

Referring to the flowchart of FIG. 5, in such a hybrid process, steps 54 and 56 of the full ray tracing process may be omitted, as there is no need to cast primary rays, and determine their first intersection with objects in the scene. The first intersection point data for each pixel is instead obtained from the G-buffer. The process may then proceed to the shading stage 58 based on the first intersection point for each pixel obtained from the G-buffer. However, where secondary rays are considered emanating from the first intersection point, these will need to be cast in the manner described by reference to FIG. 5. Thus, steps 54, 56 and 58 will be performed in the same manner as previously described in relation to the full ray tracing process for the secondary rays. The colour determined for a pixel will be written to the frame buffer in the same manner as step 60 of FIG. 5, based on the shading colour determined for the pixel based on the first intersection point (as obtained from the G-buffer), and, where applicable, the intersections of any secondary ray with objects in the scene, determined using ray tracing.

Figure 7:
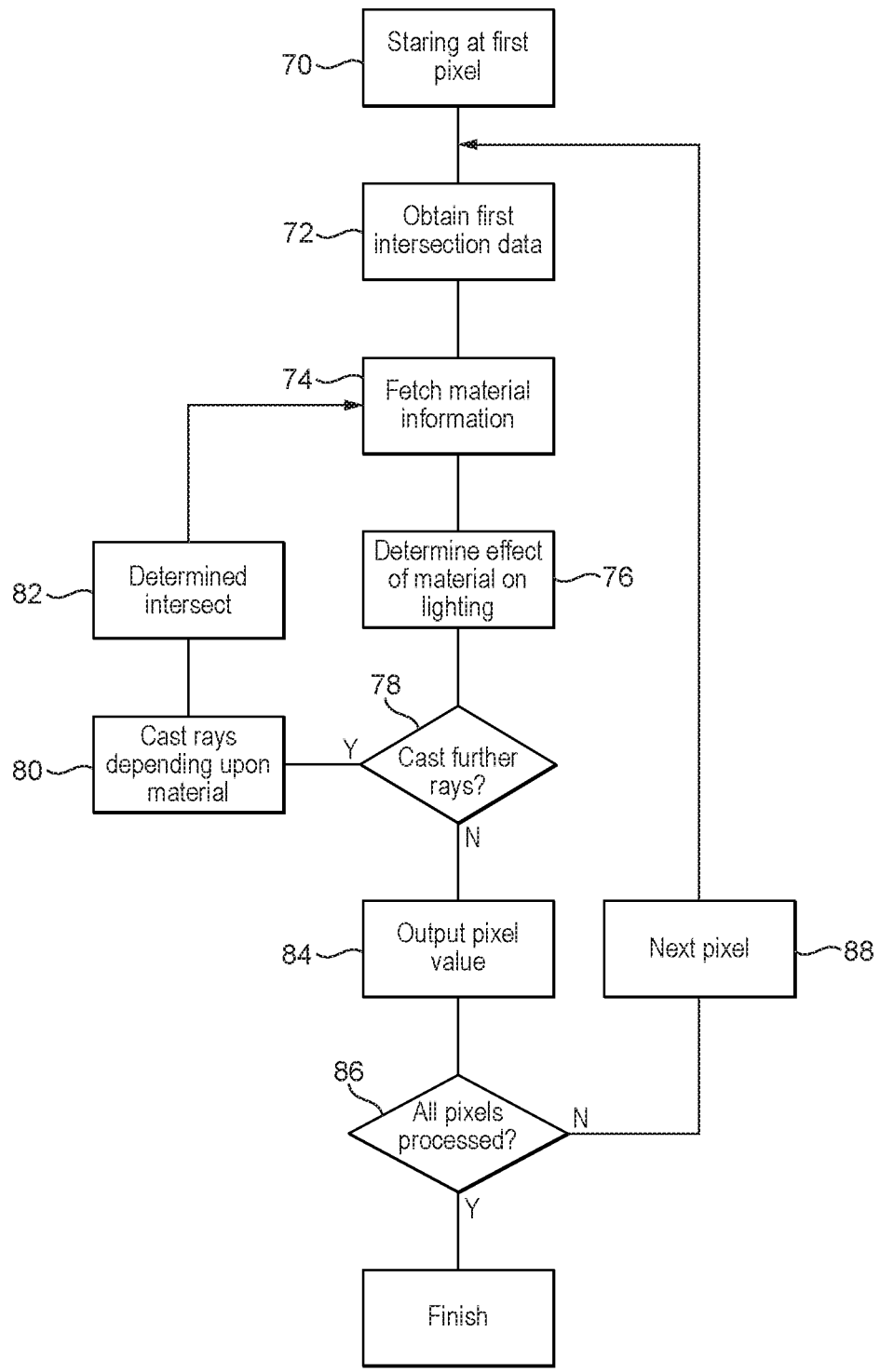
FIG. 7 is a flowchart illustrating the steps which may be performed in an embodiment of a ray tracing process.

Certain aspects of the way in which both full and hybrid ray tracing process may be performed will be described in more detail by reference to FIG. 7.

The process starts at a first pixel to be considered (step 70). The first intersection point information for the pixel is obtained (step 72). For a full ray tracing process this would involve casting a primary ray from a viewpoint through the pixel in the image plane into the scene, and determining the first intersection point of the ray with an object in the scene i.e. the intersection with the closest object. This may be performed in the manner described by reference to FIG. 5, steps 54 and 56, using an acceleration structure to facilitate determining the first intersection point. Alternatively, for a hybrid ray tracing process, the first intersection point for the ray is obtained by reading the G-buffer—step 72.

Information relating to the material of the surface of the object e.g. primitive which is first intersected is obtained. This may be obtained from the G-buffer in hybrid processes—step 74.

The effect of the material of the surface of the first object intersected upon the lighting of the scene is determined—step 76. It is then determined whether any secondary rays are to be cast—step 78. In some cases, e.g. depending upon the material of the surface of the object first intersected, one or more secondary ray may be generated—step 80. For example, where the object is, at least to some degree, transparent, a refracted secondary ray may be generated. A shadow ray may be generated from the first intersection point to the light source. Where the surface of the object is reflective, one or more reflected secondary rays may be generated as described above. The paths of the reflected secondary rays will depend upon whether the surface of the object is specular i.e. mirror-like, or more glossy, such that diffuse reflection occurs.

The first intersection of the secondary ray with an object in the scene is identified (step 82), and the process returns to step 74. Steps 74 and 76 are repeated for the secondary ray, and it is then determined whether any further secondary ray is to be cast—step 78. If so, the loop including steps 80, 82, 74, 76 and 78 is repeated, and so on, until no further secondary rays are required to be cast. The method then proceeds to step 84 in which an output value i.e. colour value for the pixel is calculated based on the lighting information determined in step 76 (for the first intersection, and the intersection of any secondary ray considered).

In step 86 it is determined whether all pixels have been processed. If not, the process returns to step 72 in respect of the next pixel (step 88). If so, the process finishes.

Figure 8:
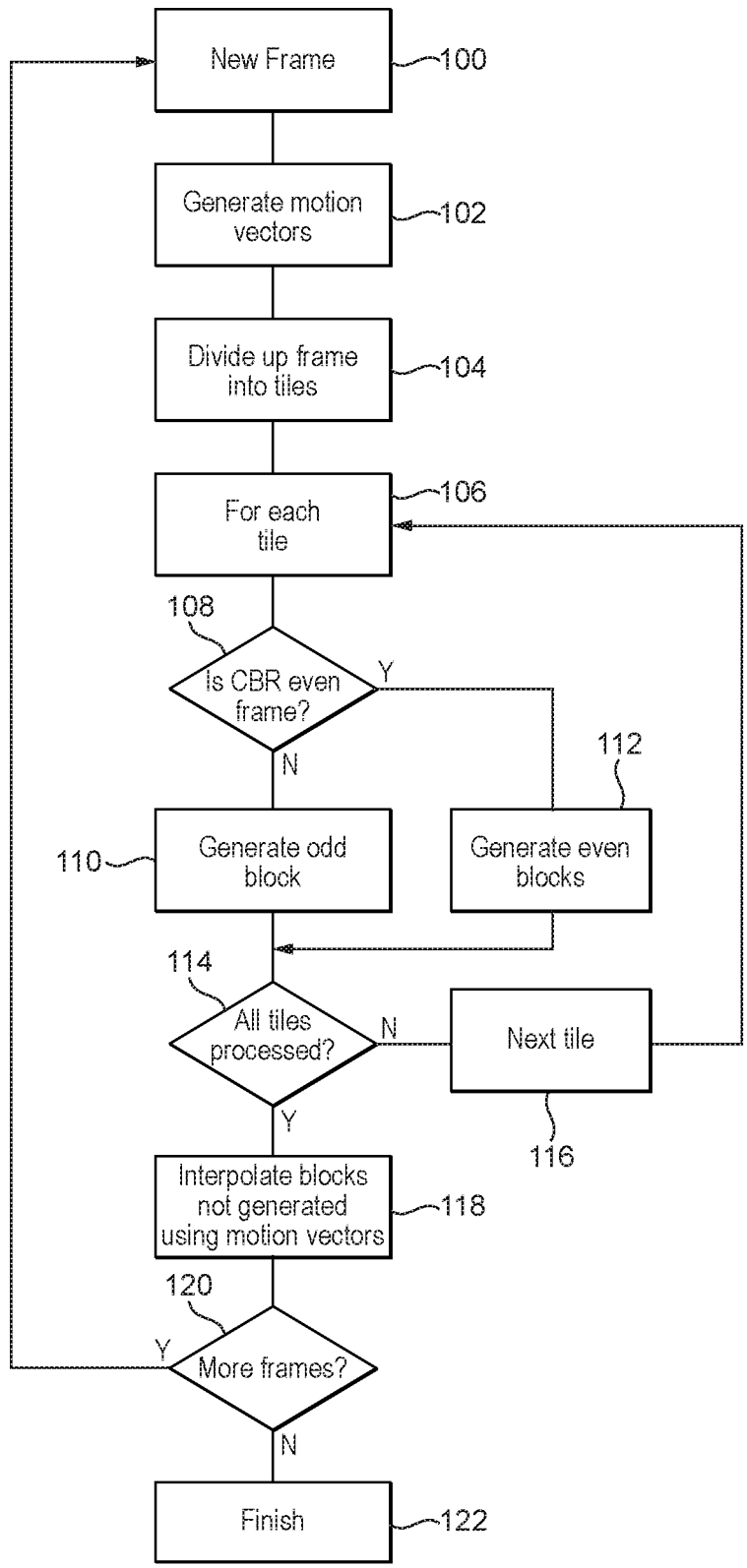
FIG. 8 is a flow chart illustrating an embodiment in which ray tracing is performed in a checkerboard manner in accordance with the technology described herein.

FIG. 8 is a flowchart illustrating the way in which ray tracing may be performed in a checkerboard manner in accordance with one embodiment of the technology described herein. This flowchart illustrates the steps which are performed in respect of a tile-based rendering implementation.

For each new frame (step 100), motion vectors are generated in respect of objects appearing in the frame (step 102). The primitives may be primitives, such as polygons. The motion vectors are generated based on tracking the movement of objects between frames. The identity of each individual object is recorded to enable the objects to be tracked between frames. The generation of motion vectors for each object may be performed by the CPU or GPU.

In this tile based example, the frame is then processed as individual tiles (step 104). The size of the individual tiles may vary, but, in some exemplary embodiments, each tile is a 16×16 pixel area. Each tile is considered in turn (step 106). For each tile, it is determined whether the frame is a CBR even frame (step 108). If not, output data is newly generated for pixels in the blocks using a ray tracing process in respect of the odd blocks of a set of blocks defining a checkerboard pattern within the tile (step 110). If the frame is an even frame, output data is newly generated by ray tracing for pixels in the blocks using a ray tracing process in respect of the even blocks of the set of blocks defining a checkerboard pattern within the tile (step 112).

It is then determined whether all the tiles have been processed (step 114). If not, the method returns to step 106 and step 108 and then step 110 or 112 as appropriate are performed in respect of the next tile (step 116). This is repeated until all tiles have been processed, at which point the method proceeds to step 118, in which output data is derived for the pixels in the blocks in respect of which data was not newly generated for the new frame using a ray tracing process in step 46 or 47, as appropriate, taking into account the motion vectors. It is then considered whether there are more frames to be rendered (step 120). If so, the method returns to step 100, and is repeated in respect of the next frame. Once all frames have been rendered, the process ends (step 122)

Thus, the newly generated output data, for the odd or even blocks, depending whether the frame is a CBR even or odd frame, is generated using a ray tracing process, which may be a full ray tracing process as described with reference to FIGS. 4 and 5, or a hybrid ray tracing process as described in relation to FIG. 6. In either case, at least some of the steps of a ray tracing process are performed to generate new output data for the frame in respect of pixels in the applicable blocks for that frame. This may be performed without relying upon data previously generated in relation to a previous frame, or, for example, data relating to the traversal of an acceleration structure previously generated may be reused. Where a hybrid ray tracing process is used, the intermediate rasterisation "first intersection point" data structure may be generated as a checkerboard, in respect of blocks corresponding to those of the checkerboard to be used in the checkerboard ray tracing process.

The output data for pixels in the other "missing" blocks, which is not newly generated by ray tracing in relation to a particular frame, is derived in step 118 based upon data generated in respect of a previous frame (which, for standard checkerboard rendering as illustrated in FIG. 8, will be the immediately preceding frame). For example, the output data for pixels generated in respect of the preceding frame may simply be reused, or output data may be derived for the new frame based on the previously generated output data for pixels, taking into account the motion of objects between frames, as exemplified in the method of FIG. 8. Where the motion of objects between frames is considered, the motion may be used to identify one or more data elements from a previous frame whose output data may be reused to provide output data for one or more data elements of a region in the new frame. For example, where an object is moving to the right, when identifying a data element from the previous frame whose output data may be reused in respect of a data element in the new frame, a data element from the previous frame which is to the left of the data element in the new frame may be selected. These data elements may correspond to the same position on the moving object in the respective frames. When implementing these techniques, the data selected for reuse may be selected by reference to the output data for the preceding frame at a data element level, rather than data generated in respect of regions of the preceding frame e.g. in a frame buffer. This may ensure that output data may be obtained even where the data element in respect of which the data was generated in the immediately preceding frame did not form part of a region in respect of which data was newly generated for that frame.

It will be appreciated that the data for the "missing" blocks need not necessarily be derived using output data for pixels in those blocks generated in relation to the preceding frame. In some exemplary embodiments, an intermediate data structure generated for the "missing" blocks in a preceding frame is reused, with new data for the "missing blocks" in respect of the new frame being generated using the intermediate data structure. The new data may be generated in respect of the new frame may be generated using a (partial) ray tracing process. However, as the intermediate data structure is reused, even if some steps of a ray tracing process are used to generate the data for the "missing blocks", the amount of ray tracing processing which is required to be performed in order to provide the output data is reduced in comparison to that which would be required to newly generate data for a block using ray tracing without reference to a previously generated intermediate data structure. For example, the intermediate data structure may be an acceleration structure, or data relating thereto, or may be a rasterisation generated data structure indicative of intersection data. The intermediate data structure may have been generated as a checkerboard, in respect of blocks corresponding to those used in the checkerboard ray tracing process.

By way of example, in the above tile-based checkerboard rendering process described by reference to FIG. 8, each tile may be made up of 16×16 pixels. Each checkerboard may be made up of 3×3 pixels. It will be appreciated that the size of the tiles and/or checkerboard blocks may vary, and these values are only exemplary. Of course, it is not necessary for the checkerboard rendering to be performed in a tile based manner.

Regardless of whether a tile based technique is used, when performing a ray tracing process in a checkerboard manner, it has been found that it is advantageous to use blocks that are 2×2 pixel blocks or larger, and in an embodiment 3×3 pixel blocks or larger. It has been found that by using such larger blocks, improved spatial locality for ray tracing may be obtained.

The block size selection may also take into account a frame (display) refresh rate. In particular, if the refresh rate is lower, then the size of the blocks may need to be reduced so as to reduce potentially visible artefacts (whereas for higher refresh rates, larger blocks can be used). Thus the refresh rate may also be used as a parameter when determining the block size to use.

Referring to FIGS. 9A-9D, when a specular region is present in a frame, it is desirable that the "checkerboard"

operation around the specular region is disabled. A "specular region" refers to a region at which reflection of light occurs in a mirror-like manner i.e. such that the incident light is reflected in a single outgoing direction, with the angle of reflection being equal to the angle of incidence. Specular reflection may occur at a smooth surface, such as a mirror. In contrast, reflection of light at an uneven surface will be diffuse, such that light will not be reflected at the angle as an angle of incidence upon the surface. A specular reflection may be particularly noticeable to the user, especially where the reflection is bright i.e. arising from a bright light source. Thus, it is desirable to render the region to a high quality level. Furthermore, a specular reflection may move significantly with a change in viewpoint i.e. camera position. This makes it less appropriate to reuse previously generated data in relation to the specular region. For example, this may result in artefacts such as a specular region appearing to "pop" in or out. This is in contrast to regions where diffuse reflection occurs, where any artefacts resulting from the reuse of previously generated data are likely to be less noticeable to the user. In accordance with the techniques herein, it is therefore desirable that output data be newly generated for a specular region using a ray tracing technique, e.g. for each new frame.

Figure 9A:
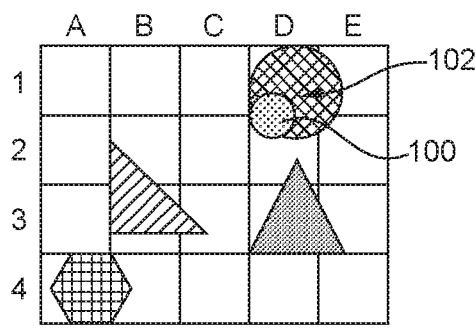
FIGS. 9A and 9B illustrate the movement of a specular region between frames.

Referring to FIG. 9A, a specular region 100 is detected in a first frame the region of an object 102. Detection of the specular region may be performed in any suitable manner. For example, where an angle of incidence of a ray from the viewpoint e.g. camera to a surface of an object is similar to an angle of reflection of a ray cast back to a light source, and the surface is mirror-like, then it may be assumed that there will be specular reflection. Alternatively or additionally, a specular region may be considered to be present where a region of a surface is significantly brighter than other regions.

Figure 9C:
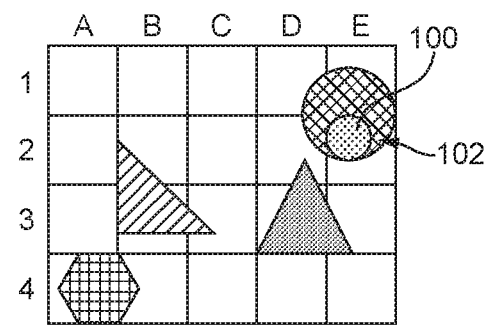
FIGS. 9C and 9D illustrate the way in which rendering of the frames may be performed using a checkerboard ray tracing process in accordance with the technology described herein.
Figure 9B:
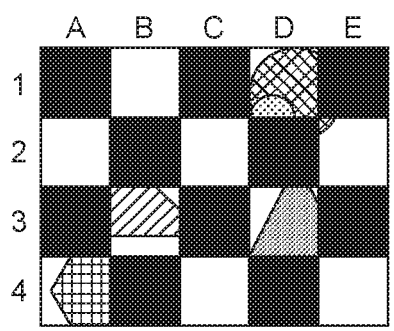
Figure 9D:
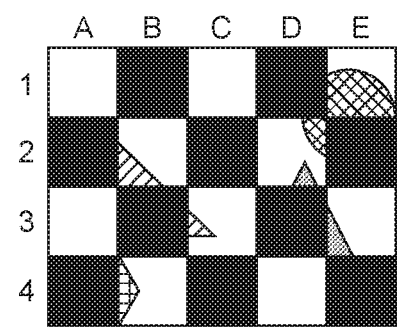

If the checkerboard rendering technique proceeds in the usual manner, e.g. as described in relation to FIG. 8, then output data would be newly generated by ray tracing in respect of the current frame i.e. the first frame for the white blocks shown in FIG. 9B. FIG. 9C illustrates the position to which the specular region 100 has moved in the immediately subsequent frame (frame 2), while FIG. 9D illustrates those blocks for which output data would be newly generated by ray tracing in respect of this subsequent frame if checkerboard rendering were to proceed in the usual manner, i.e. the white blocks, which were the black blocks in the preceding frame. It will be appreciated that in the FIGS. 9B, 9D, 9E and 9F, the blocks for which data is newly generated for the current frame using a ray tracing technique are shown as white blocks, in contrast to the earlier embodiments e.g. FIGS. 2A, 2B and FIGS. 3A-D, in which the blocks for which data is newly generated for the current frame are shown as black blocks.

Figure 9E:
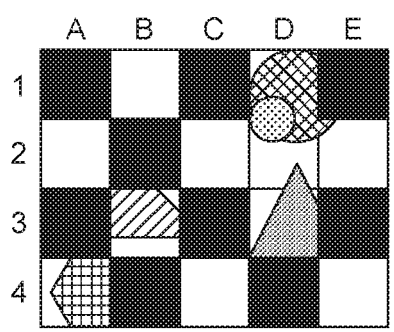
FIGS. 9E and 9F illustrate the way in which the checkerboard ray tracing process in the frames shown in FIGS. 9A and 9B may be modified due to the presence of the specular region in accordance with some embodiments of the technology described herein.
Figure 9F:
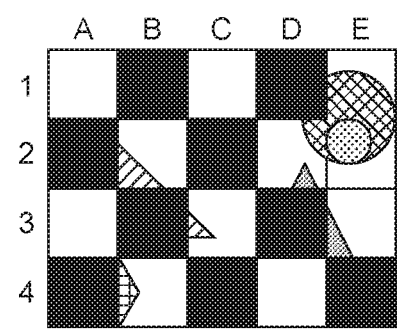

FIGS. 9E and F illustrate the way in which the rendering process may be improved for the first and second frames through disabling the checkerboard operation around the detected specular region. FIG. 9E illustrates the white blocks for which output data is newly generated by ray tracing for the current frame i.e. frame 1 in relation to this modification of the process. It may be seen that, by comparison to FIG. 9B, block D2, which includes a portion of the specular region, has been added to the subset of blocks i.e. the white blocks for which output data is to be newly generated by ray tracing. Referring to FIG. 9F, for the subsequent frame i.e. frame 2, the block E2 has been added (by comparison to situation in FIG. 9D) to the white blocks for which output data is to be newly generated using ray tracing. Thus, for both frames, it is ensured that any block including a portion of the specular region in that frame is selected for new output data generation using ray tracing. It is envisaged that where "extra" blocks are added to a subset of blocks selected for new data generation by ray processing as a result of detection of a specular region, one or more blocks may in an embodiment be removed from the subset to result in the total number of blocks in the subset being unchanged.

It will be appreciated that FIGS. 9E and 9F illustrate only one example of the way in which the selection of blocks for which output data is to be newly generated using ray tracing may be modified if a specular region is present. Any block within a given area selected based on the position of a specular region may be selected for new output data generation, e.g. an area including the specular region and a predetermined area surrounding the region.

Rather than modifying the way in which checkerboard rendering is to be performed in relation to the current frame and a subsequent frame upon detection of a specular region in the current frame, instead checkerboard rendering may be performed as usual for the current frame, with the additional ray tracing processing around the specular region only being triggered in respect of the next frame. Thus, in the example illustrated, the checkerboard regions would be as shown in FIG. 9B for frame 1, but as shown in FIG. 9F for frame 2. This may lead to some errors in the initial frame, but such errors may not be maintained for too long. Triggering the additional processing only in respect of the next frame may be appropriate where there is insufficient time to modify the way in which blocks are to be processed in the current frame i.e.in a real-time process.

The presence of a specular region in one frame is thus advantageously used to trigger the additional processing by ray tracing of blocks around the specular region at least in a next frame or frames. In this case, the area around the specular region to be subjected to additional processing may be defined using the position of the specular region as detected in the preceding frame, or may be based upon some prediction of how the region may have moved between frames. For example, it may be seen that in the example of FIG. 9F, the area to be subjected to additional processing takes account of the movement of the specular region, such that block D1 is no longer selected for additional processing, but E2 is.

Rather than trying to track the movement of specular regions between frames, it may be computationally less expensive, and still advantageous, to simply define an area around a specular region detected in a current frame to be subjected to additional processing in a subsequent frame or frames (and in an embodiment the current frame) which is sufficiently large to try to encompass any possible movement of the specular region.

Figure 10:
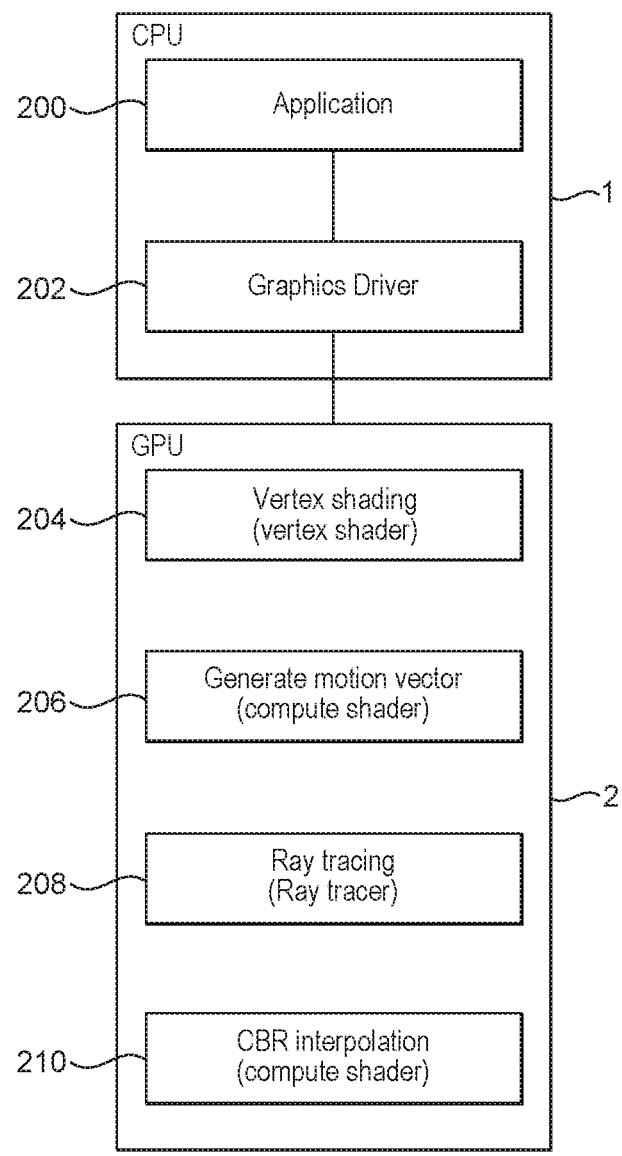
FIG. 10 illustrates a system which may be used to implement certain steps of the methods described herein.

FIG. 10 illustrates where, in a data processing system, the steps of the method may be performed.

FIG. 10 shows an exemplary host processor (CPU) 1 on which an application 200 is executing that requires a sequence of frames to be rendered by an associated graphics processor (GPU) 2. Accordingly, as shown in FIG. 10, a graphics driver 202 executing on the host CPU 1 will receive commands and data from the application 200 for rendering the sequence of frames and provide appropriate commands and data to the GPU 2 to render the required sequence of frames.

The GPU 2 will then perform the rendering operation, including vertex shading 204 the primitives for a frame, generating motion vectors 206 for the primitives (which may be achieved, for example, by the GPU executing an appropriate compute shader program to generate the motion vectors), generating new data required for frame regions using an appropriate ray tracing process 208 (by executing an appropriate ray tracer program), and deriving 210 any "missing" data for a region in a frame, e.g. by running an appropriate, e.g. "CBR interpolation", compute shader program on the GPU 2.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a data processing system that includes a data processor operable to render a sequence of frames to produce a sequence of frames for display, each frame representing a view of a scene of one or more objects; the method comprising:
when a new frame in the sequence of frames is to be rendered;
the data processor rendering the new frame by, for each one of a subset of set of a plurality of regions of the new frame, newly generating output data for data elements in the region in respect of the new frame using a ray tracing process, and by deriving output data for data elements in each remaining region of the set of a plurality of regions of the frame based on data generated previously in respect of a preceding frame;
the method further comprising:
when a specular region is detected in a current new frame, identifying an area of the current frame and/or of one or more subsequent frame based on the location of the specular region, and using the area to select one or more additional regions for which output data is to be newly generated using a ray tracing process in respect of the current frame and/or one or more subsequent frame.

2. The method of claim 1 wherein the regions of the set of a plurality of regions are in the form of blocks, and the subset of regions and the remaining regions of the set of a plurality of regions define a checkerboard pattern.

3. The method of claim 1 wherein each region is a 3×3 pixel block or larger.

4. The method of claim 1 wherein the method comprises using a frame refresh rate in determining a size of the regions of the set of a plurality of regions.

5. The method of claim 1 wherein the subset of the set of a plurality of regions is one of a group of N subsets of regions within the set of a plurality of regions, wherein the method comprises, for each new frame, the data processor newly generating output data for data elements in the regions of only one of the N subsets of regions using a ray tracing process, and deriving output data for data elements in each region of each one of the other subsets of regions based on data generated previously in respect of one of the N−1 immediately preceding frames, wherein output data is newly generated for data elements of any given region in the set of a plurality of regions only once every N frames.

6. The method of claim 1 wherein the output data for data elements in each one of the subset of a plurality of regions which is newly generated in respect of the new frame using ray tracing is generated using a ray tracing process that uses an intermediate data structure obtained for the new frame and indicative of a first intersection of each one of a plurality of rays passing through data elements in the region with an object, wherein the intermediate data structure is obtained by performing a rasterisation pass for some or all of the new frame.

7. The method of claim 1 wherein the output data for data elements in each one of the subset of a plurality of regions which is newly generated in respect of the new frame using ray tracing is generated using a ray tracing process that uses an intermediate data structure obtained for the new frame and indicative of a first intersection of each one of a plurality of rays passing through data elements in the region with an object, wherein the intermediate data structure is obtained by ray tracing.

8. The method of claim 1 wherein the output data for data elements in each remaining region is derived by using an intermediate data structure previously generated in respect of a preceding frame to generate output data for the region in respect of the new frame.

9. The method of claim 1 wherein deriving output data for data elements in each remaining region based on data generated previously in respect of a preceding frame comprises reusing output data previously generated by ray tracing for the data elements in respect of the preceding frame to provide the output data for the data elements in respect of the new frame.

10. The method of claim 1 comprising using data indicative of the motion of objects between frames obtained by the tracking of the motion in deriving the output data for data elements in each remaining region of the set of a plurality of regions of the frame based on data generated previously in respect of a preceding frame.

11. The method of claim 1 comprising using data indicative of the motion of objects between frames obtained by the tracking of the motion of the one or more objects between frames to modify the subset of regions of the set of a plurality of regions for which output data is to be newly generated using a ray tracing process in respect of the current frame and/or one or more subsequent frame.

12. A data processing system comprising:
a rendering circuit operable to render a sequence of frames to produce a sequence of frames for display, each frame representing a view of a scene of one or more objects, wherein the rendering circuit is operable in a first mode to generate output data for data elements of a region of a new frame using a ray tracing process, and wherein the rendering circuit is operable in a second mode to derive output data for data elements of a region of a frame based on data generated previously in respect of a preceding frame;
the system further comprising a control circuit operable to cause the rendering circuit to, for each one of a subset of a set of a plurality of regions of the new frame, newly generate output data for data elements in the region in respect of the new frame using a ray tracing process, and to cause the rendering circuit to derive output data for data elements in each remaining region of the set of a plurality of regions of the frame for the new frame based on data generated previously in respect of a preceding frame;
wherein the control circuit is further operable to:
when a specular region is detected in a current new frame, identify an area of the current frame and/or of one or more subsequent frame based on the location of the specular region, and use the area to select one or more additional regions for which output data is to be newly generated using a ray tracing process in respect of the current frame and/or one or more subsequent frame.

13. The system of claim 12 wherein the control circuit is operable to cause the rendering circuit to generate the output data for data elements in each one of the subset of a plurality of regions which is newly generated in respect of the new frame using a ray tracing process that uses an intermediate data structure obtained in respect of the new frame and indicative of a first intersection of each one of a plurality of rays passing through data elements in the region with an object, wherein the intermediate data structure is obtained by performing a rasterisation pass for some or all of the new frame.

14. The system of claim 12 wherein the control circuit is configured to cause the rendering circuit to generate the output data for data elements in each one of the subset of a plurality of regions which is newly generated in respect of the new frame using a ray tracing process that uses an intermediate data structure obtained in respect of the new frame and indicative of a first intersection of each one of a plurality of rays passing through data elements in the region with an object, wherein the intermediate data structure is obtained by ray tracing.

15. The system of claim 12 wherein the control circuit is operable to cause the rendering circuit to derive output data for data elements in each remaining region of the new frame using an intermediate data structure previously generated in respect of a preceding frame.

16. The system of claim 12 wherein the control circuit is operable to cause the rendering circuit to derive output data for data elements in each remaining region of the new frame based on data generated previously in respect of a preceding frame by reusing output data previously generated by ray tracing for the data elements in respect of the preceding frame to provide the output data for the data elements in respect of the new frame.

17. The system of claim 12 wherein the regions of the set of a plurality of regions are in the form of blocks, and the subset of regions and the remaining regions define a checkerboard pattern.

18. The system of claim 12 wherein the rendering circuit is configured to use a frame refresh rate in determining a size of the regions of the set of a plurality of regions.

19. The system of claim 12 wherein the rendering circuit is configured to use data indicative of the motion of objects between frames obtained by the tracking of the motion in deriving the output data for data elements in each remaining region of the set of a plurality of regions of the frame based on data generated previously in respect of a preceding frame.

20. A non-transitory computer readable storage medium storing software code which, when executing on a processor, performs a method of rendering a sequence of frames to produce a sequence of frames for display, each frame representing a view of a scene of one or more objects;

the method comprising:

when a new frame in the sequence of frames is to be rendered;

the data processor rendering the new frame by, for each one of a subset of set of a plurality of regions of the new frame, newly generating output data for data elements in the region in respect of the new frame using a ray tracing process, and by deriving output data for data elements in each remaining region of the set of a plurality of regions of the frame based on data generated previously in respect of a preceding frame;

the method further comprising:

when a specular region is detected in a current new frame, identifying an area of the current frame and/or of one or more subsequent frame based on the location of the specular region, and using the area to select one or more additional regions for which output data is to be newly generated using a ray tracing process in respect of the current frame and/or one or more subsequent frame.

* * * * *